Aug. 8, 1944.  K. DAMMANN  2,355,424
MANUFACTURE OF COMPOSITE PRODUCTS
Filed June 4, 1941  17 Sheets-Sheet 1
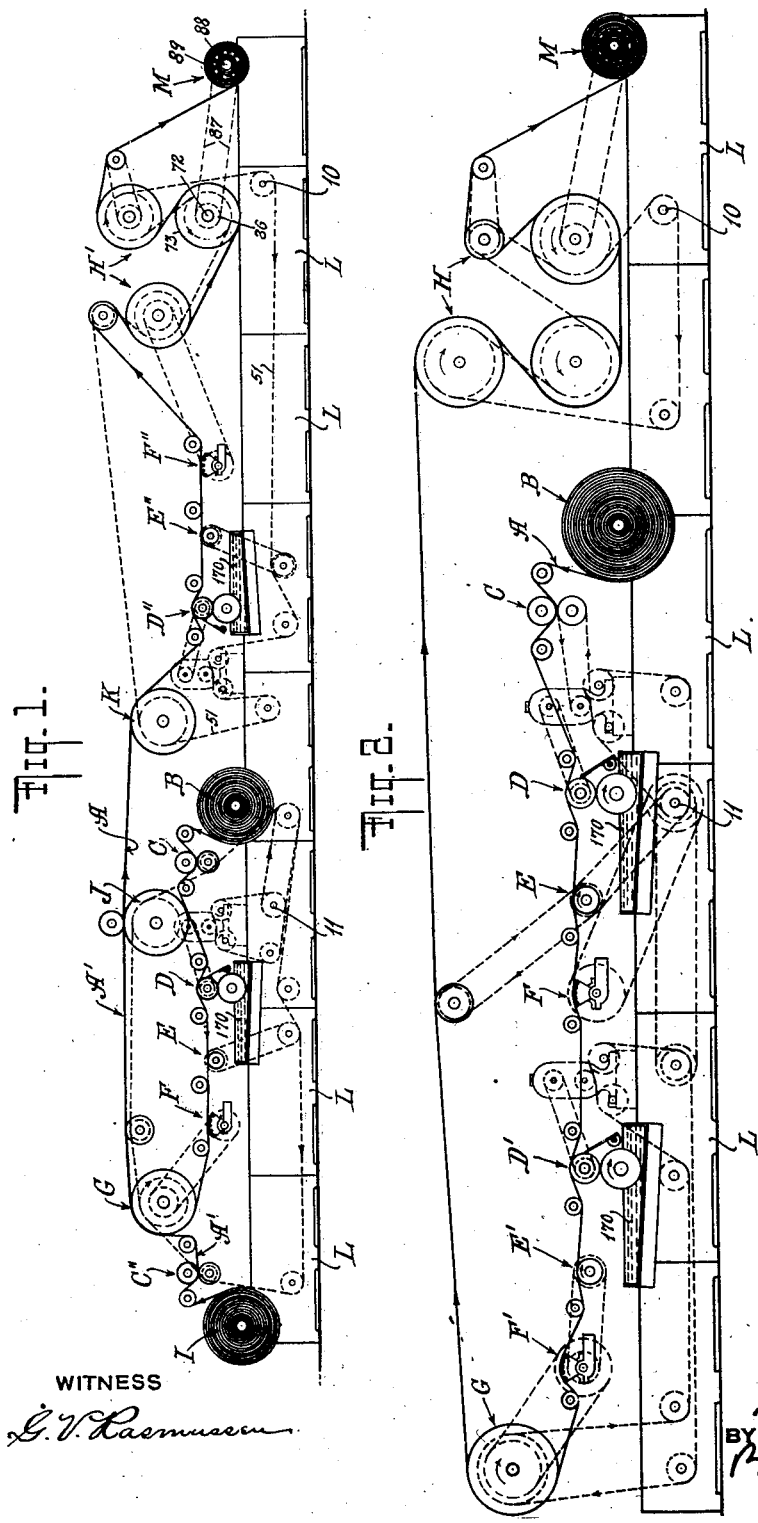
WITNESS
G. V. Rasmussen
INVENTOR
KARL DAMMANN
BY
ATTORNEYS Aug. 8, 1944.  K. DAMMANN  2,355,424
MANUFACTURE OF COMPOSITE PRODUCTS
Filed June 4, 1941   17 Sheets-Sheet 2
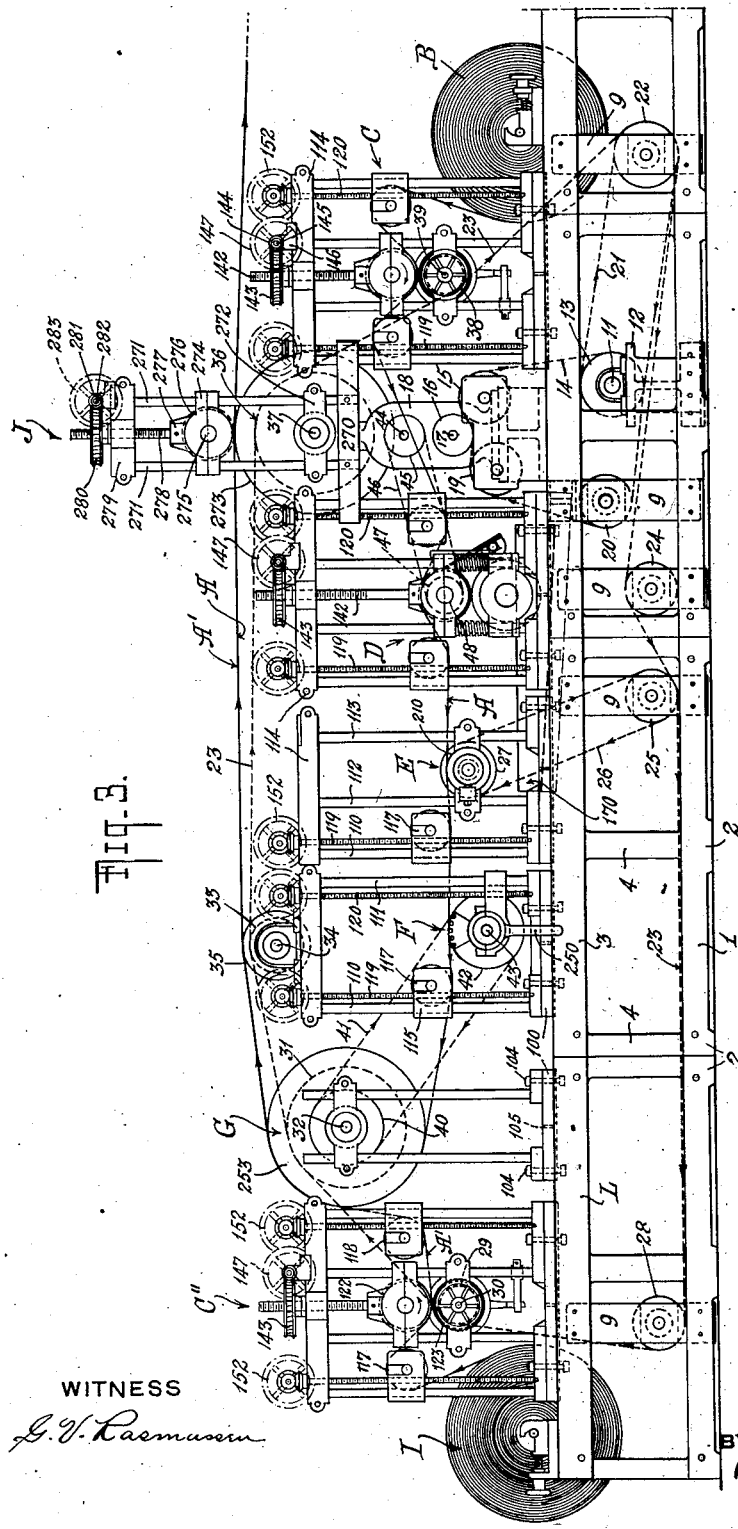
INVENTOR
KARL DAMMANN

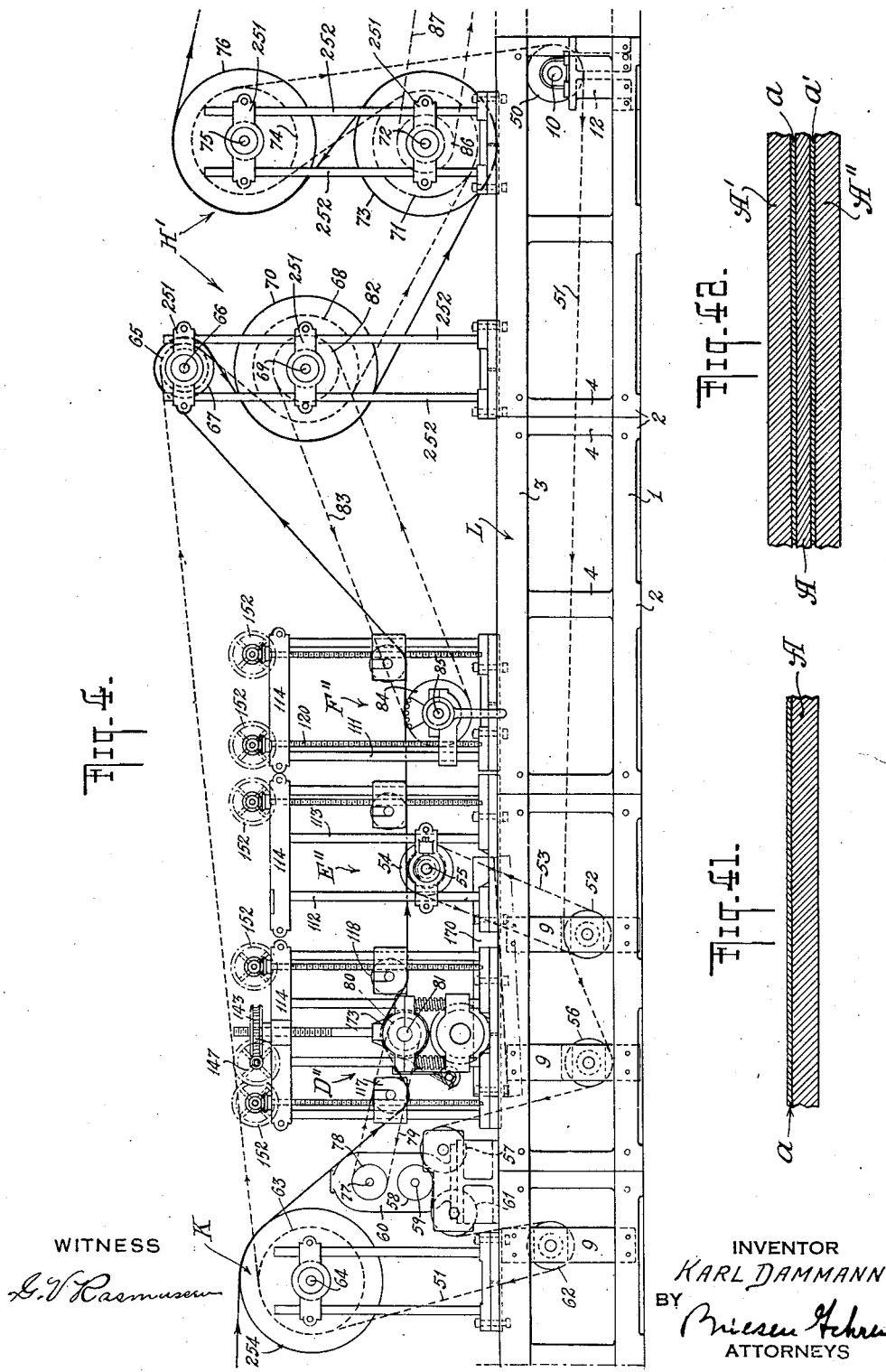

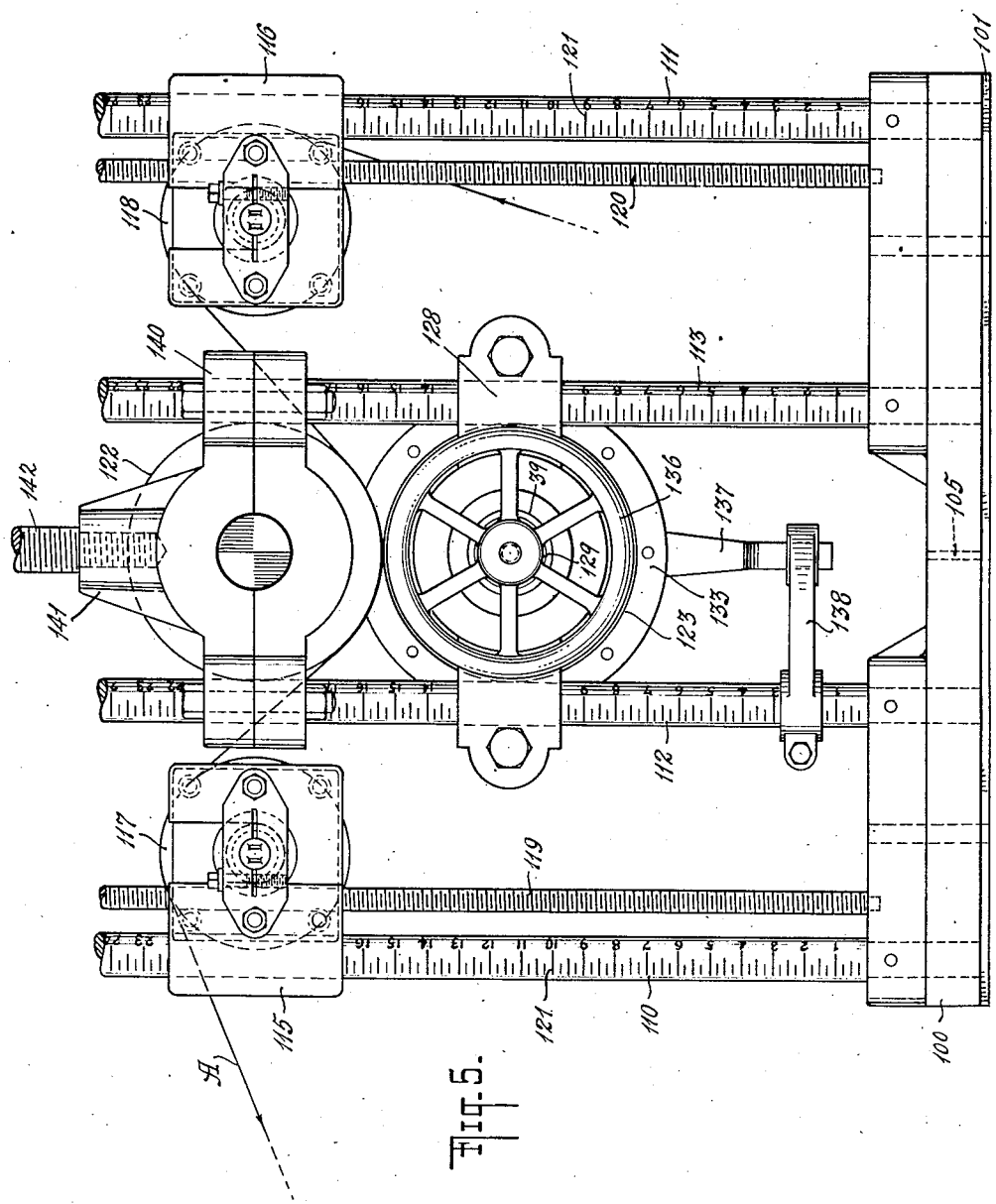

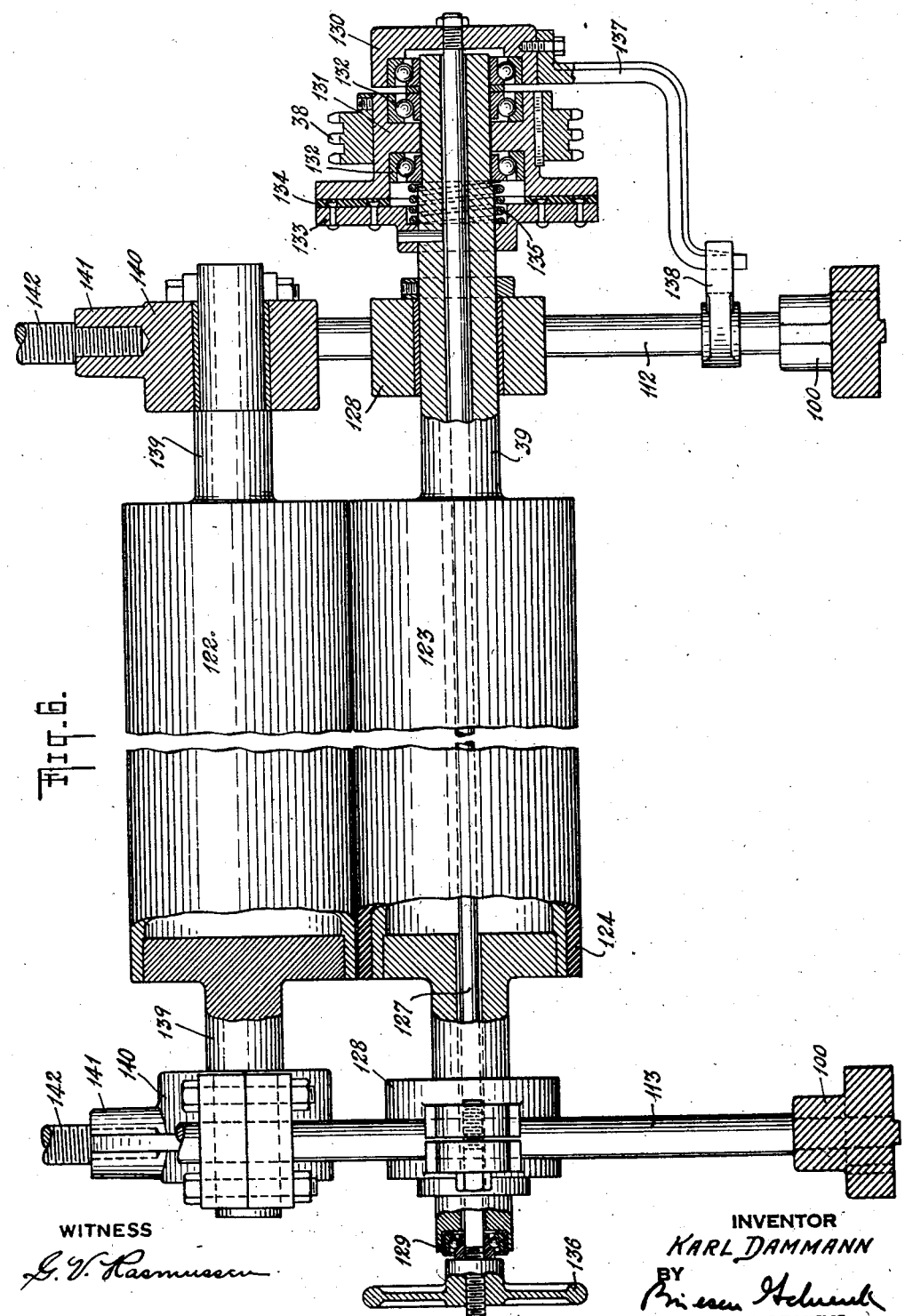

Aug. 8, 1944.  K. DAMMANN  2,355,424
MANUFACTURE OF COMPOSITE PRODUCTS
Filed June 4, 1941  17 Sheets-Sheet 6
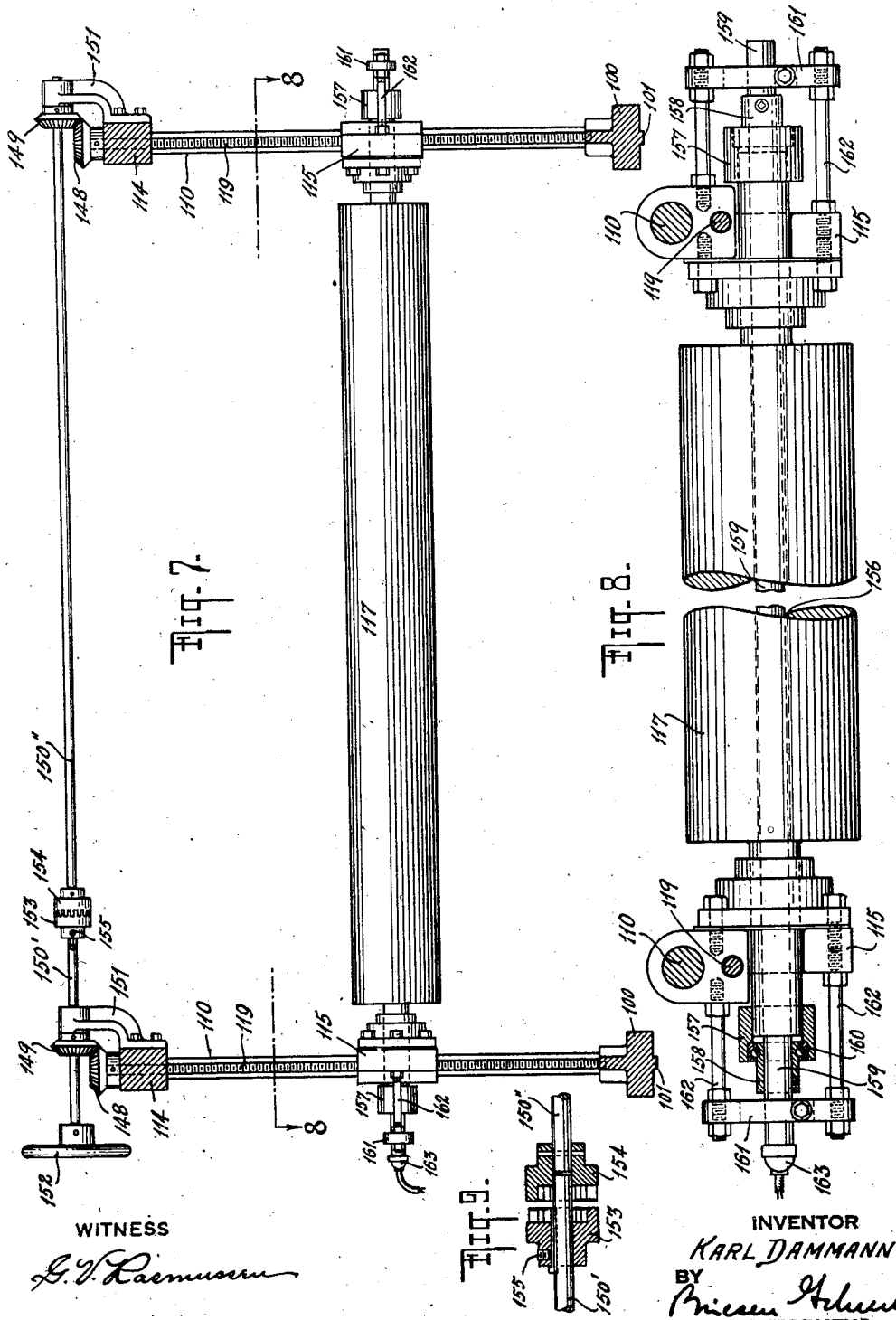
WITNESS
INVENTOR
KARL DAMMANN
BY
ATTORNEYS

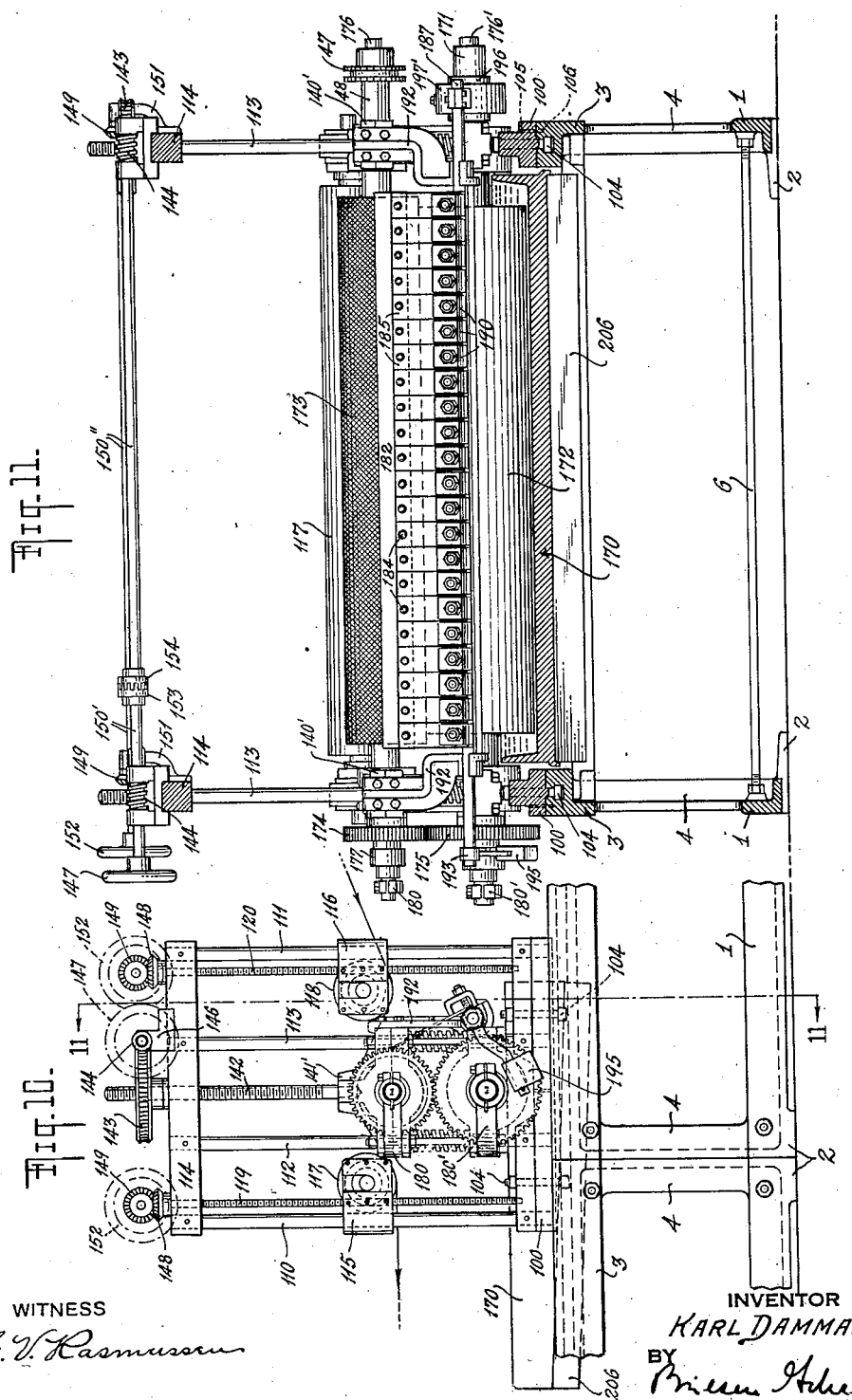

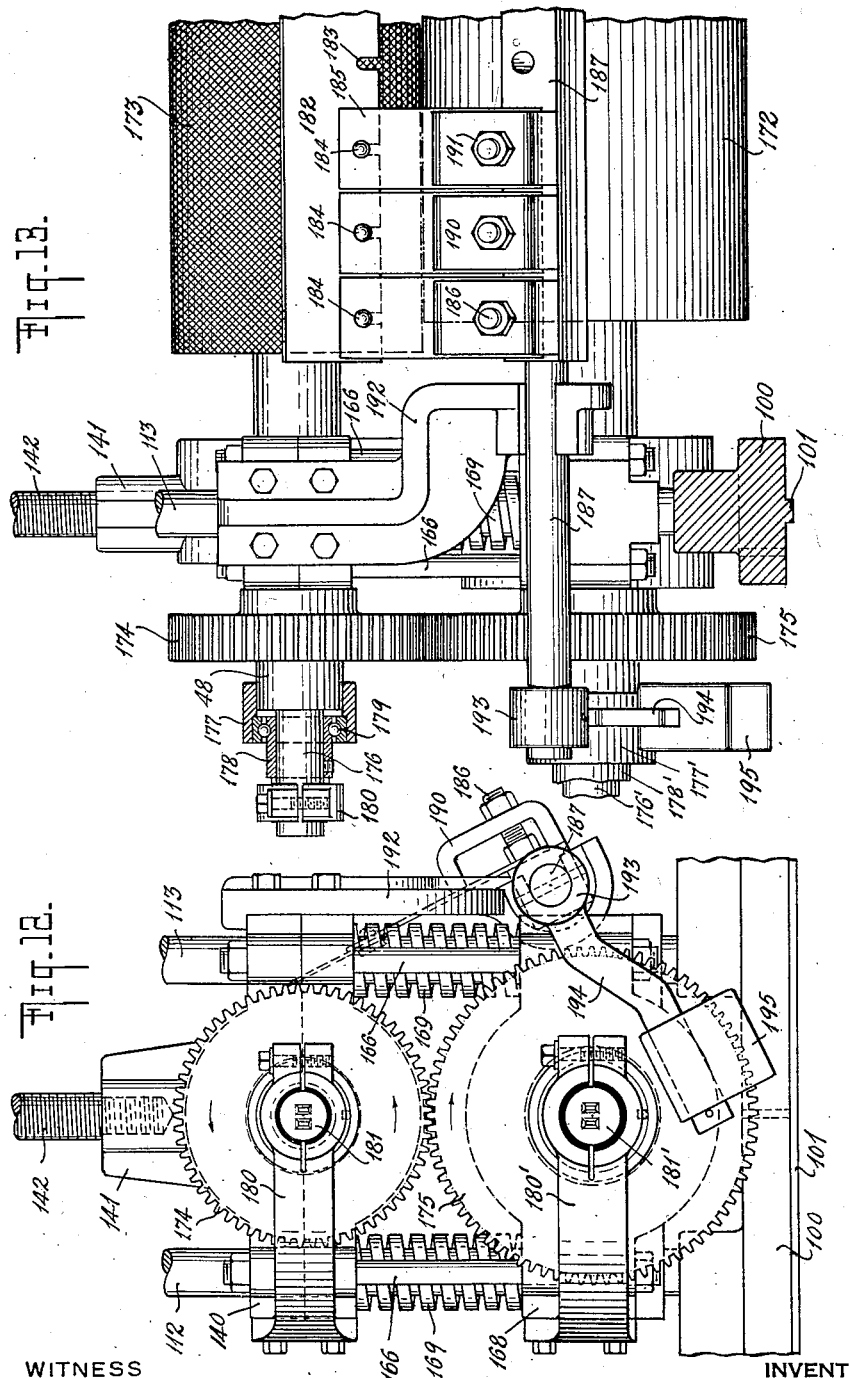

Aug. 8, 1944.　　　　K. DAMMANN　　　　2,355,424
MANUFACTURE OF COMPOSITE PRODUCTS
Filed June 4, 1941　　　17 Sheets-Sheet 9
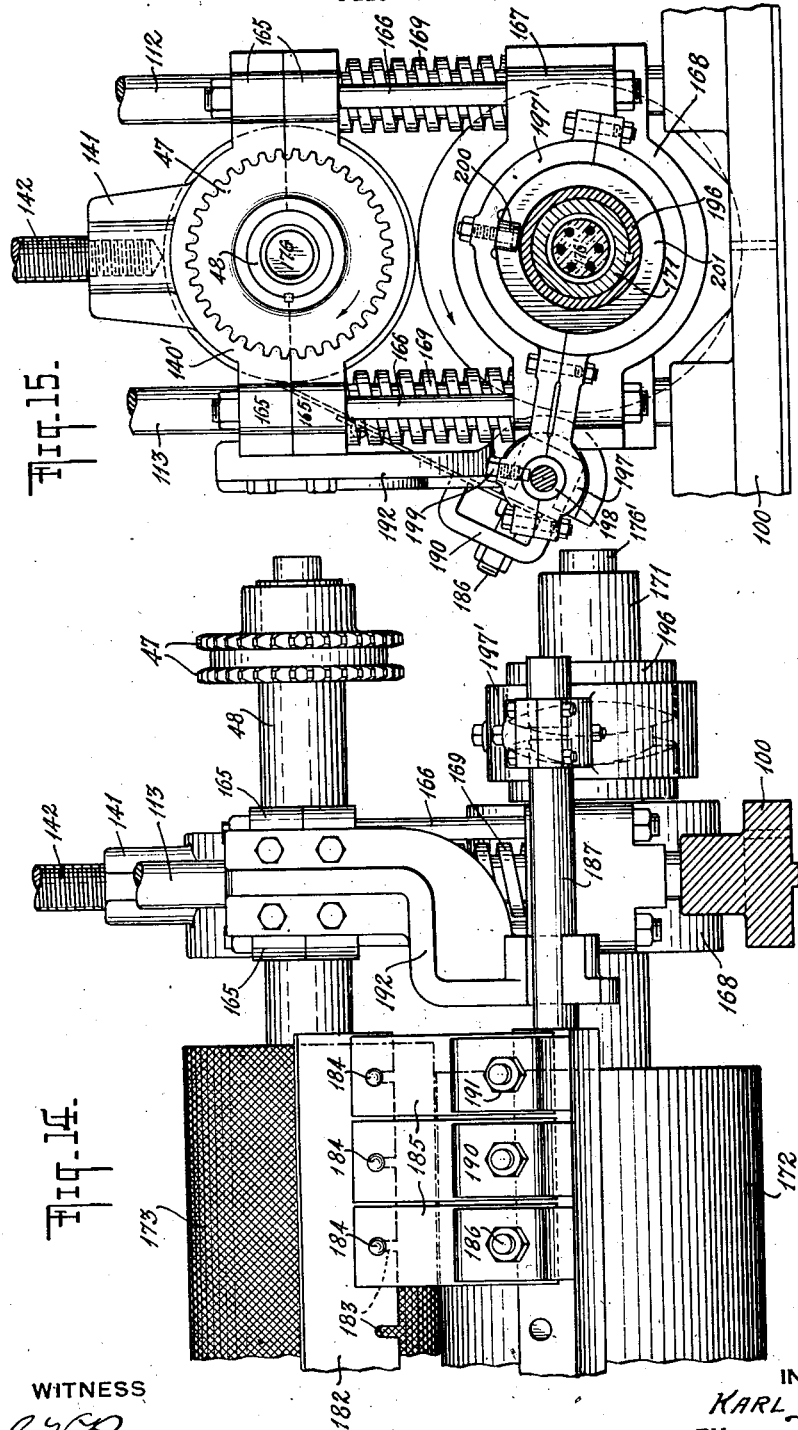
WITNESS
INVENTOR
KARL DAMMANN
BY
ATTORNEYS Aug. 8, 1944. K. DAMMANN 2,355,424
MANUFACTURE OF COMPOSITE PRODUCTS
Filed June 4, 1941 17 Sheets-Sheet 10
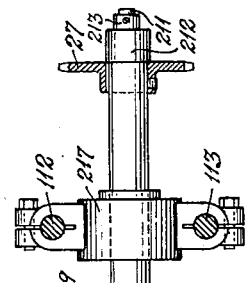
Fig. 16.
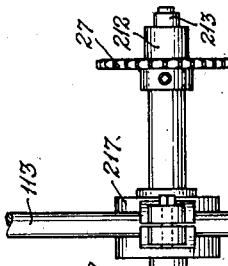
Fig. 17.
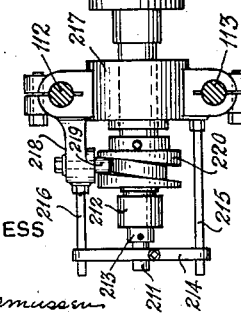
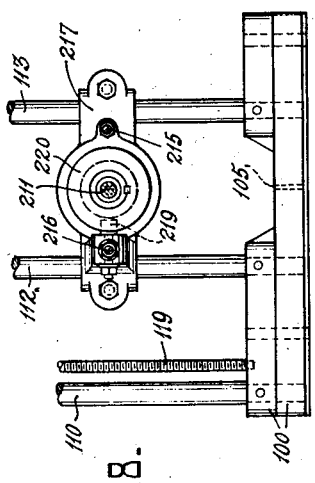
Fig. 18.
WITNESS
G. V. Rasmussen
INVENTOR
KARL DAMMANN
BY
ATTORNEYS Aug. 8, 1944.   K. DAMMANN   2,355,424
MANUFACTURE OF COMPOSITE PRODUCTS
Filed June 4, 1941   17 Sheets-Sheet 11
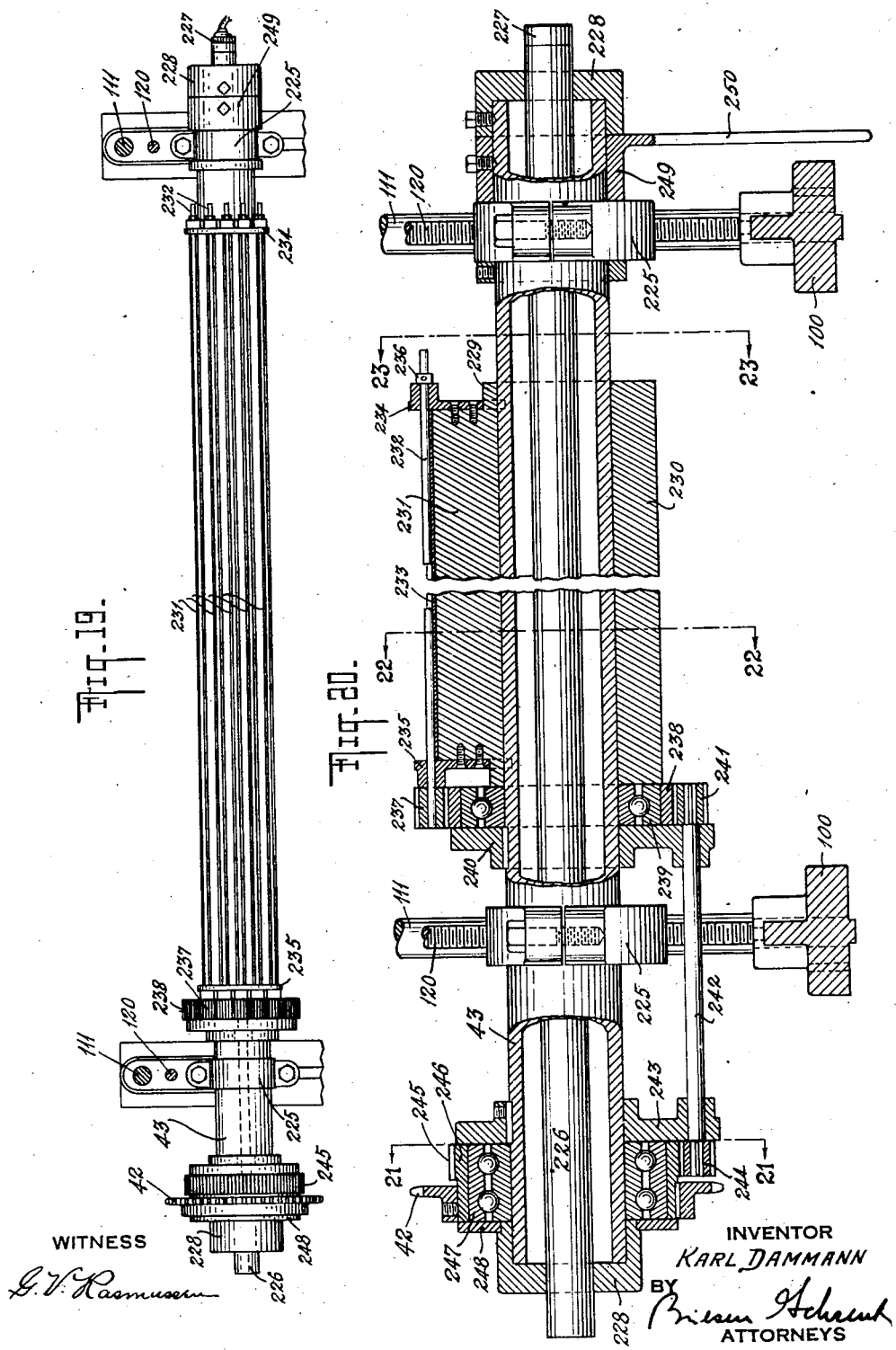
INVENTOR
KARL DAMMANN

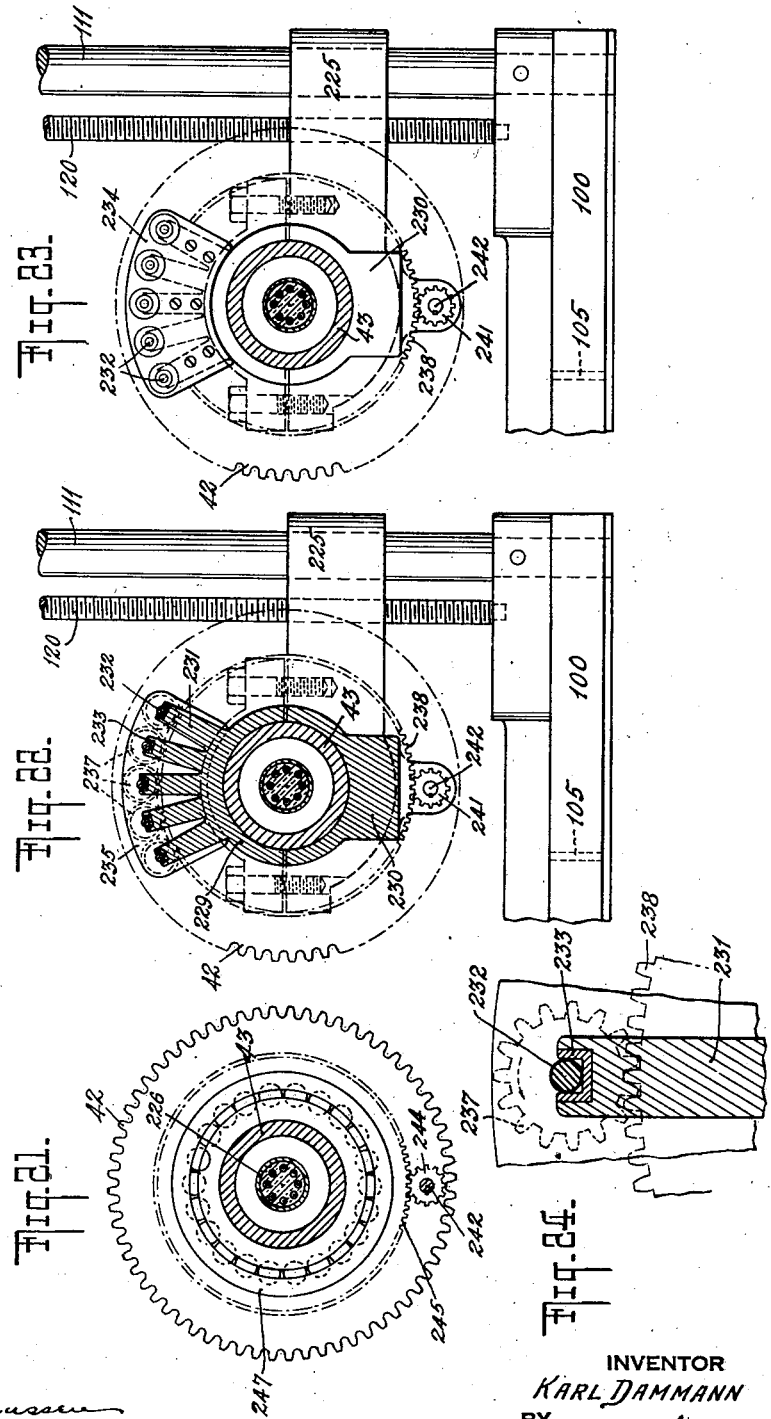

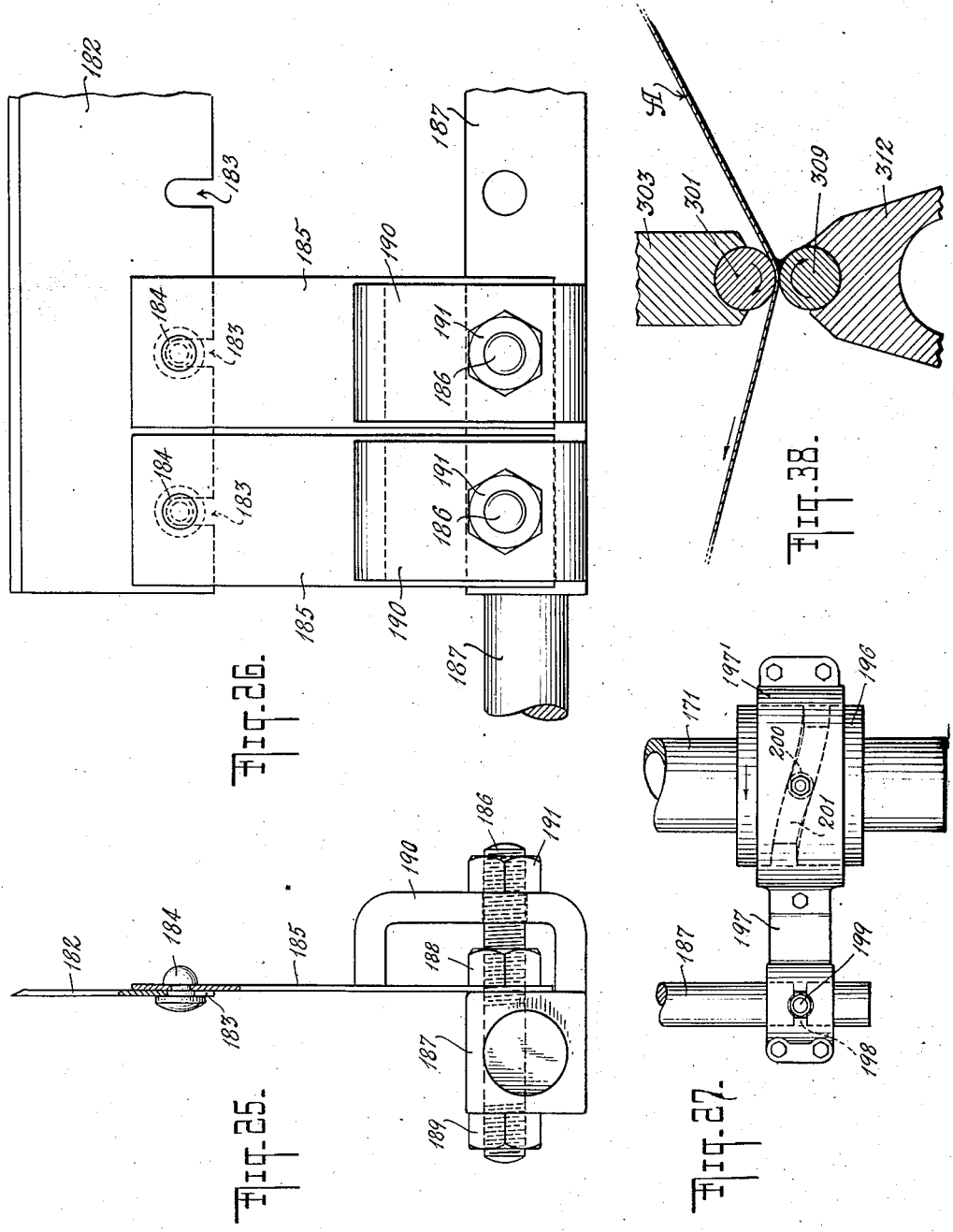

Aug. 8, 1944.  K. DAMMANN  2,355,424
MANUFACTURE OF COMPOSITE PRODUCTS
Filed June 4, 1941  17 Sheets-Sheet 14
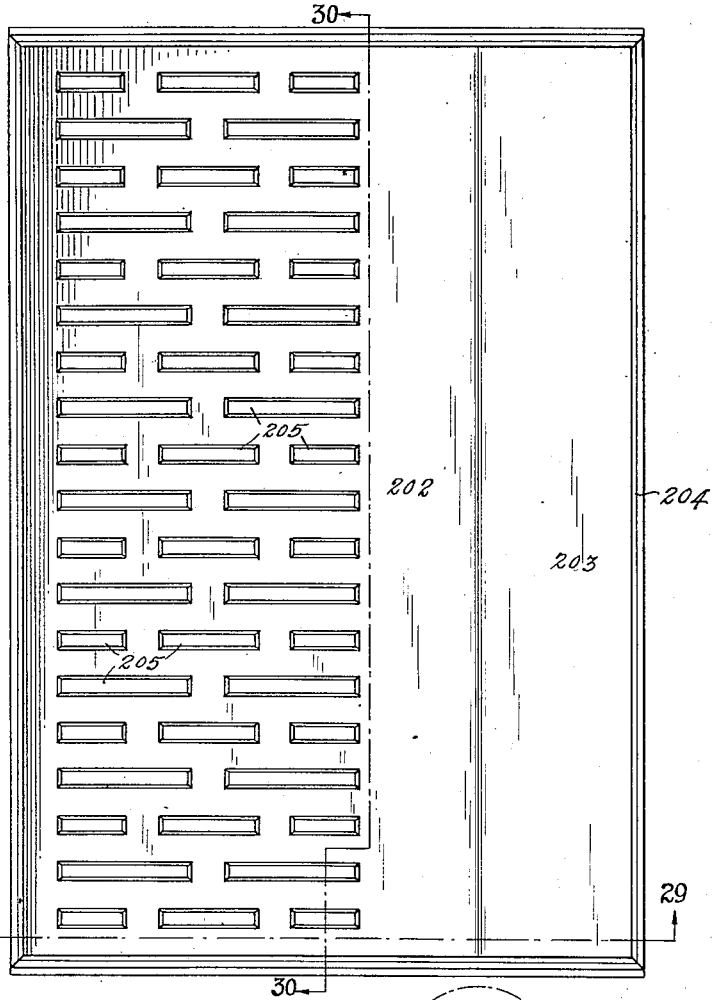
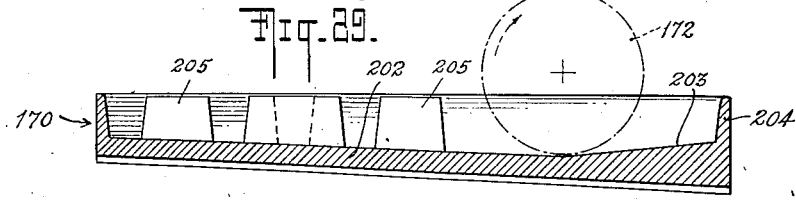
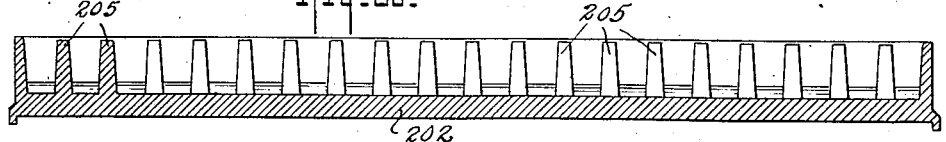
WITNESS
INVENTOR
KARL DAMMANN
BY
ATTORNEYS

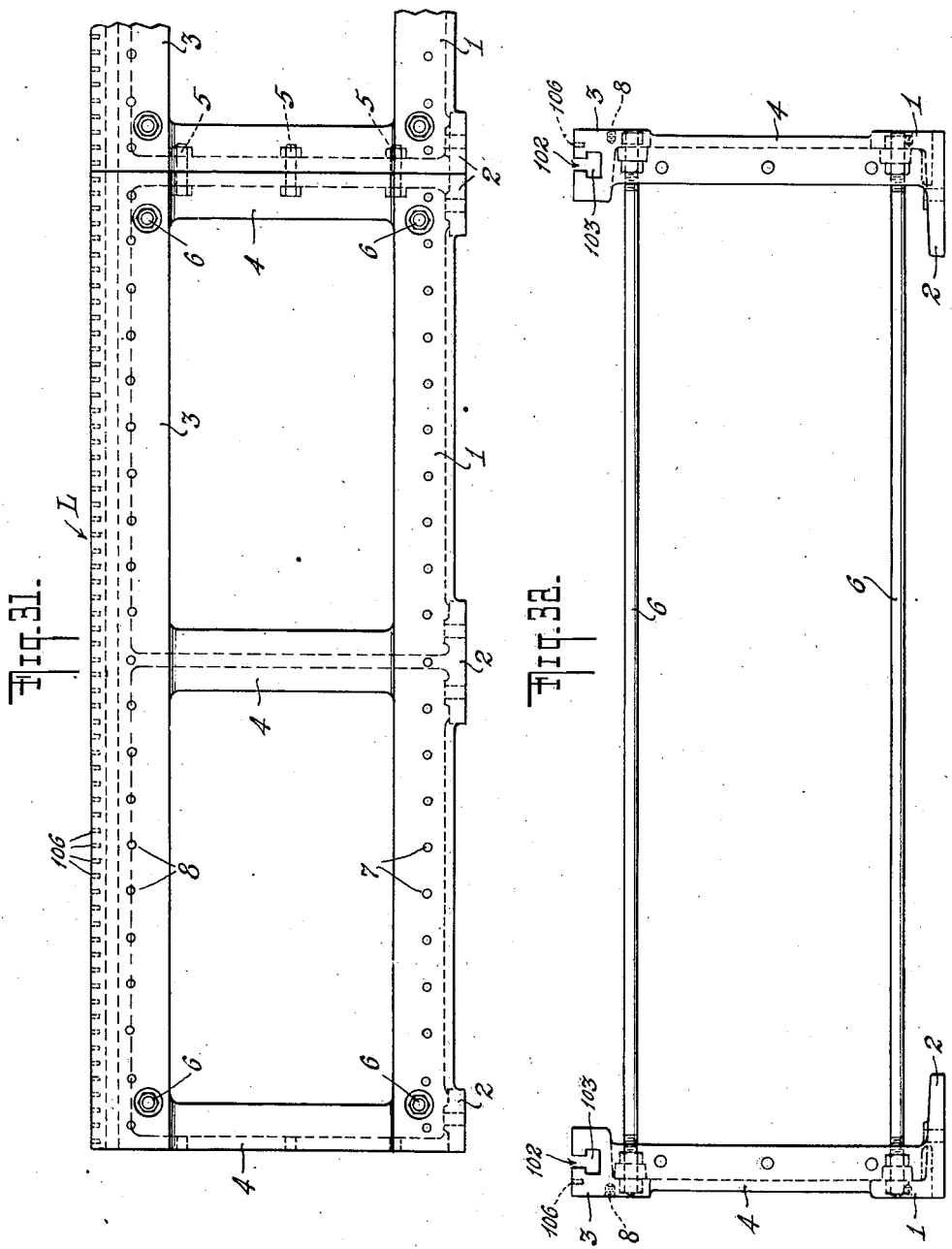

Aug. 8, 1944.　　　K. DAMMANN　　　2,355,424
MANUFACTURE OF COMPOSITE PRODUCTS
Filed June 4, 1941　　　17 Sheets-Sheet 16
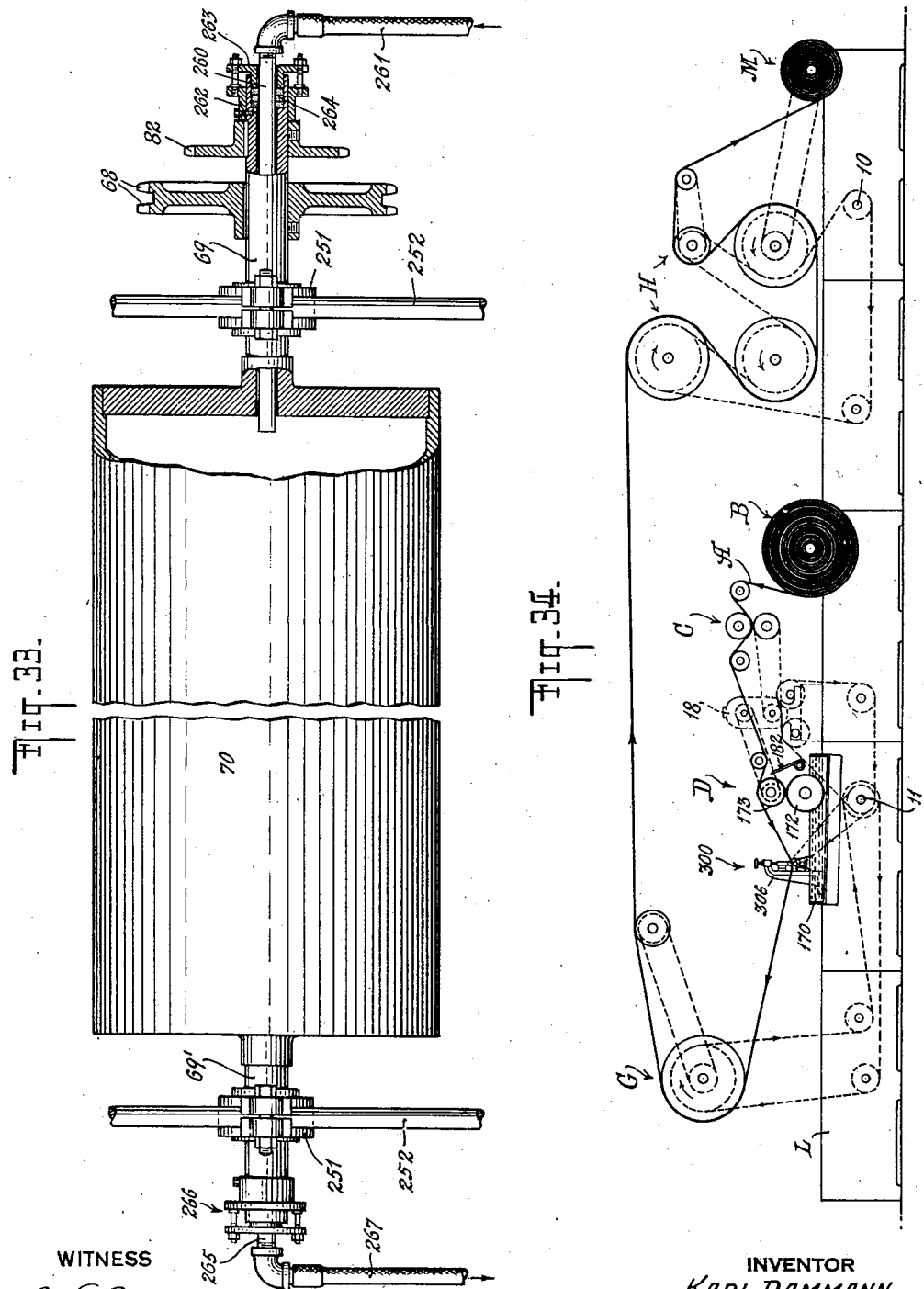
WITNESS
INVENTOR
KARL DAMMANN
BY
ATTORNEYS

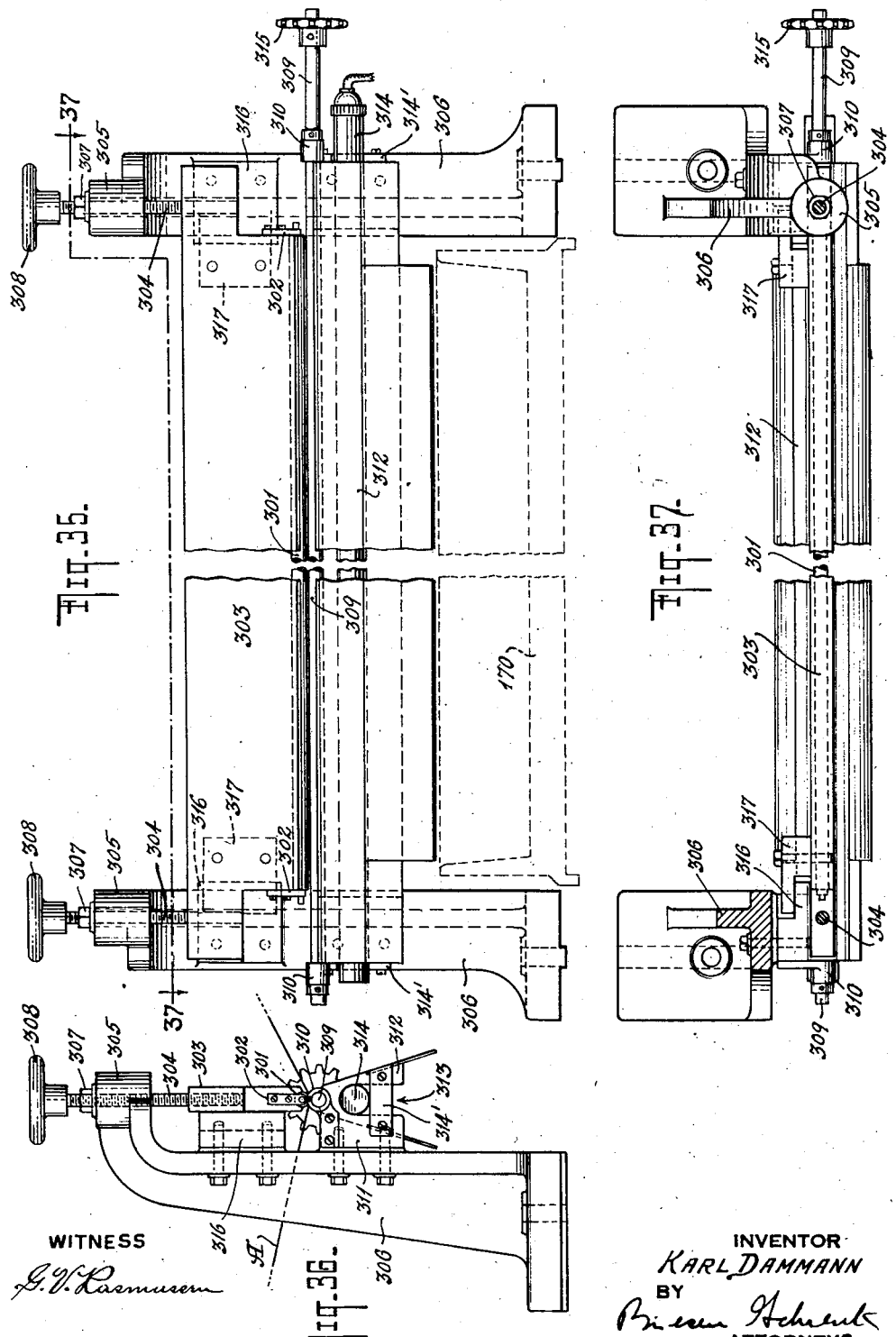

Patented Aug. 8, 1944

2,355,424

UNITED STATES PATENT OFFICE 2,355,424

MANUFACTURE OF COMPOSITE PRODUCTS

Karl Dammann, Trenton, N. J., assignor to Paterson Parchment Paper Company, Bristol, Pa., a corporation of New Jersey Application June 4, 1941, Serial No. 396,498

18 Claims. (Cl. 91—18)

This invention relates to the manufacture of composite products composed of sheets or webs of fabric material such as, paper and layers of applied material by use of the method which includes joining the applied material with the web in a molten condition through the medium of a pick-up roller which is dipped into the molten bath of such material and a roller which transfers it from the pick-up roller to a surface of the web. Fairly satisfactory results have been attained in the past by this method in applying materials having low melting points and relatively low viscosities, such as, for example, paraffin. On the other hand, where the material is a highly viscous material and has to be applied at a relatively high temperature, around 450° F., numerous difficulties have been encountered. A material of high viscosity has the tendency when picked up by the pick-up roller from the molten bath, to come in blobs and widely varying thicknesses and cannot be made uniform by the mere passage between the pick-up roller and the transfer roller. The result is that such material is usually applied in a non-uniform manner to the surface of the web. Numerous suggestions have been made and various expedients have been tried by the art, but despite all efforts to produce a satisfactory uniform layer with such material, the art has so far been unsuccessful in eliminating entirely the streaked, uneven and non-uniform distribution of such material on the fabric material. Another difficulty encountered not only with highly viscous materials but also with materials of low viscosity and low melting points, is that during the smoothing steps, the material has the tendency to become thicker along the edges of the web so that it is practically always necessary in the manufacture of composite sheets or webs to trim the side edges thereof in order to provide a better commercial product. Another major problem encountered in producing a layer having a smooth polished surface is the removal of air trapped in the applied material for unless such entrapped air is removed, the layer does not have a smooth unbroken surface and a uniform appearance. This problem is of special importance in the manufacture of laminated sheets for wherever there are entrapped air bubbles, there is a weakness in the binding of the laminated sheets and the uniform appearance of the composite product is broken and materially impaired.

The object of the invention is to provide a machine for manufacturing composite sheets or webs which is readily adaptable to the producing in a continuous, single operation, of any type of such products, whether it be a single web having one or more layers of the same or different compositions, or a plurality of or laminated webs of the same or different materials having one or more layers of the same or different kinds of applied materials therebetween.

Other objects and advantages of the invention will become apparent after a perusal of the following description, read in connection with the accompanying drawings, in which Fig. 1 is a diagrammatic elevational view of a form of the machine for making a two-ply strip of fabric material; Fig. 2 is a similar view of a form of the machine for applying a double layer to one side of the fabric material; Fig. 3 is a side elevational view of a portion of the machine and showing, in enlarged view, the feed end or left-hand portion of the machine illustrated in Fig. 1 of the drawings; Fig. 4 is a view similar to Fig. 3 and illustrating the remainder of the machine with the exception of the take-up roller; Fig. 5 is an enlarged side elevational view of the feed control rollers and their associated guide and preheating rollers; Fig. 6 is a front elevational view of the feed control rollers illustrated in Fig. 5, several of the parts being shown in section to illustrate their constructions; Fig. 7 is a front elevational view of one of the guide and preheating rollers of the machine; Fig. 8 is a plan view, taken on the line 8—8, of the roller illustrated in Fig. 7, several of the parts being shown in section; Fig. 9 is an enlarged detail section of a portion of the adjusting mechanism associated with the roller illustrated in Fig. 7; Fig. 10 is a side elevation view of the applying rollers and associated heated guide rollers; Fig. 11 is a front elevational view of the applying mechanism; taken along the line 11—11 of Fig. 10; Fig. 12 is an enlarged side elevational view of the applying rollers and doctor blade associated therewith; Fig. 13 is a front elevational view of the left-hand portion of the mechanism illustrated in Fig. 12; Fig. 14 is a front elevational view of the right-hand portion of the mechanism illustrated in Fig. 12; Fig. 15 is a view similar to Fig. 12, but looking from the other side of the machine; Fig. 16 is a plan view of the oscillating distributing roller and its operating mechanism; Fig. 17 is a front elevational view of the mechanism shown in Fig. 16; Fig. 18 is a side elevational view of the mechanism shown in Figs. 16 and 17 looking from the left of such figures; Fig. 19 is a top plan view of the multiple smoothing rollers; Fig. 20 is an enlarged longitudinal sectional view of the mechanism illustrated in Fig. 19, the portion of such mechanism associated with the bearing brackets being shown in rear elevation; Fig. 21 is a section taken along the line 21—21 of Fig. 20; Fig. 22 is a section taken along the line of 22—22 of Fig. 20; Fig. 23 is a sectional view taken along the line of 23—23 of Fig. 20; Fig. 24 is an enlarged elevational view of a detail of the driving mechanism for the multiple smoothing rollers; Fig. 25 is a side elevational view, partly in section, of the doctor blade; Fig. 26 is a front elevational view of a portion of the doctor blade which is shown in complete form in Fig. 11 of the drawings; Fig. 27 is an enlarged detail in plan view of the cam actuating mechanism for the doctor blade; Fig. 28 is an enlarged plan view of the waxing pan associated with the applying mechanism; Fig. 29 is a section taken along the line 29—29 of Fig. 28; Fig. 30 is a section taken along the line 30—30 of Fig. 28; Fig. 31 is a side elevational view of a complete section and a portion of an adjacent section of the supporting base or frame; Fig. 32 is a front elevational view of the complete section illustrated in Fig. 31 and looking from the left of such figure; Fig. 33 is a front elevational view, partly in section, of one of the cooling rollers and associated mechanism; Fig. 34 is a diagrammatic view, in side elevation, of a form of the machine for applying a single heavy layer to a strip of fabric material; Fig. 35 is a front elevational view, partly broken away, of the distributing mechanism in the machine illustrated in Fig. 34 of the drawings; Fig. 36 is a side elevational view of the mechanism shown in Fig. 35; Fig. 37 is a sectional plan view of the mechanism illustrated in Fig. 35, the section being taken along the line 37—37 of Fig. 35, and Fig. 38 is an enlarged cross-sectional view of a portion of the distributing mechanism illustrated in Figs. 35 to 37, inclusive; Fig. 39 is a cross-section, greatly enlarged, of a portion of the intermediate product just after the applied material has been joined to the web; Fig. 40 is a similar view illustrating the condition of the applied material after it has been worked by the reciprocating distributing roller; Fig. 41 is a similar view showing the condition of the applied material after it has been smoothed and polished by the multiple smoothing rollers and Fig. 42 is a similar view of a laminated product produced in accordance with the invention.

Before considering in detail the constructions of the several mechanisms which go to make up the machine of the instant invention, it would be well to point out in advance that the machine is capable of great flexibility and is readily adapted to the production of a wide variety of fabric materials, such as, wrappers or containers or bag materials for the packaging of food products and other articles requiring protection in packaging, storage and/or shipment and for the protection of products while they are subjected to certain conditions either produced artificially or encountered during storage and/or transportation, phonograph records, artificial leathers, and, in fact, any type of product composed of fabric material and a desired composition of applied material. The machine is readily adapted in one continuous, uninterrupted operation, to apply to one side only of the fabric material or to apply to both sides thereof with the same or different compositions, or to apply a plurality of layers of the same or different compositions to one side of the material, or to provide by means of the applied material a product composed of a plurality of plies or layers of the same or different fabric material. If the fabric material is to be given a single relatively thin layer, the arrangement of the machine will be such that the strip or web of fabric material, such as, paper in a desired form, and designated by the reference character A in Fig. 2 of the drawings, is drawn from the supply reel B by a unit which is indicated generally by the letter C and which controls the tension of the paper through the machine and prepares it for the applying operation. The paper then passes over the upper drum or roll of a device D where a layer of material of the desired composition is applied to the under surface of the strip. The paper strip then passes over an oscillating distributing roller E which distributes the applied material evenly over the under surface of the strip of paper. From the oscillating distributing roller E the paper passes over a plurality of smoothing rolls in the unit F, which smooth and polish the layer of material on the under surface of the paper. As in the formation of the product under discussion, nothing further is to be added to the paper strip A, the remaining mechanisms illustrated in Fig. 2 of the drawings are by-passed, the paper strip passing directly from the unit F to a cooling drum G and thence to a multiplicity of cooling drums which are indicated generally by the reference letter H. After leaving the drums H the paper strip is wound up on a take-up reel M. The same mechanism may be utilized also for the application of a relatively thick layer of applied material to the paper strip. This can be accomplished also by means of the arrangement illustrated diagrammatically in Fig. 34 of the drawings.

When the strip of paper A is to be given a double layer of applied material on one side thereof, it is not passed directly from the unit F to the cooling drum G but follows the path of feed illustrated in Fig. 2 of the drawings, passing from the unit F to a second material applying unit designated D', thence to a second oscillating distributing roller E', thence to a second polishing unit F' and thence to the cooling drum G. From the cooling drum G, the paper strip is drawn to the cooling drums H and the take-up reel M, as has been explained. The unit D', the oscillating distributing roller E' and the polishing mechanism F' are similar in construction to the unit D, oscillating distributing roller E and polishing unit F, respectively.

When the paper is to be made in two plies with a layer of applied material intermediate the plies and another layer of applied material on one of the exterior surfaces of the plies, the several mechanisms are arranged in the manner illustrated in Fig. 1 of the drawings. In this form of the machine, as in the form illustrated in Fig. 2 of the drawings, the paper strip or web A is drawn from a supply reel A by the tension control unit C and passes from the latter over the upper roll of the device D, over the oscillating distributing roller E, over the multiple polishing rolls of the unit F and around the drum G which instead of being cooled as in the case of the apparatus shown in Fig. 2, is heated to maintain the material in a softened or adhesive condition. At the drum G there is superimposed on the side of the paper strip A to which the layer of material has been applied, a second paper strip A' which is fed from a supply reel I, through the tension control mechanism C" which is similar in construction to unit C and from thence into engagement with the layer of material on the paper strip A. The two strips of paper A and A' with the applied layer of material sandwiched therebetween then pass from the drum G to nip rolls J by means of which the two strips of paper A and A' are firmly secured together. The united strips of paper are then passed over a cooling drum K which sets the applied material between the two strips of paper. From the cooling drum K, the united strips of paper in their feed, pass over a device D'' which applies a layer of material to the under surface of the united strips and which is similar in construction to the devices D and D', over an oscillating distributing roller E'' similar in construction to E and E', thence over a polishing unit F'', which is similar in construction to units F and F', and thence over the rolls or drums of the cooling unit H', the product leaving the unit H' then passing to the take-up reel M. It will be obvious, of course that with this machine layers of material can be applied to both sides of a single layer of the fabric material by simply interrupting the feed of the strip A' from the supply reel I.

Inasmuch as the machine diagrammatically illustrated in Fig. 1 of the drawings contains all the mechanisms which may be embodied in a machine for making a single ply of fabric material with a single layer of applied material, or a single ply of paper with a double layer of such material on one surface thereof, or a single ply of paper layered on both sides, or a two-ply strip of paper with applied material intermediate the two layers thereof, or two such united strips with a second layer of material on the exterior surfaces thereof, although such mechanisms may not be arranged in the manner shown in such figure, the following description will be concerned more particularly with the form of the machine illustrated in Fig. 1 of the drawings. Furthermore, in view of the similarity of several of the mechanisms and parts and the fact that a detailed description of a typical portion of the machine will suffice for an understanding of the construction and operation of similar portions, a detailed description of each typical portion only will be given. In this connection, it is to be pointed out that similar reference characters have been applied to similarly constructed parts throughout the several views of the drawings.

The flexibility and adaptiveness of the machine of this invention may be largely attributed to the fact that the several mechanisms thereof are each substantially unitary and are mounted on a series of specially designed sections L which are similar in construction and interchangeable. As is illustrated more clearly in Figs. 31 and 32 of the drawings, each of the sections L is composed of two side frames, each of such side frames including a bottom rail member I which is substantially L-shaped in cross-section and which is provided with a plurality of angularly-shaped bases or footings 2 for supporting the section on the floor. The bottom rail member I of each frame has integrally formed therewith a plurality of vertically disposed web members or struts 4 upon the upper ends of which is supported the integral top rail 3. Each side frame member consisting of a bottom rail I, spaced top rail 3 and integral webs 4, is connected to the other side frame member of the section L by means of four tie-rods 6, two of which extend through apertures provided in the ends of the bottom rails I and two of which extend through apertures provided in the ends of the top rails 3. Each tie-rod 6 has a length less than the outside width of the section and the outer nuts securing the tie rods to the side frame members are positioned in countersunk or enlarged portions of the apertures in the bottom and top rails, as is more clearly shown in Fig. 32 of the drawings. Thus no portion of the tie-rods 6 extend beyond the outer surfaces of the side frame members and they do not interfere with the application of bearing brackets at such portions of the side frame members. Each section L is joined to an adjacent section L by means of bolts 5 which extend through the angularly-shaped webs at the ends of each of such sections. The bottom rails I and the top rails 3 of each section are provided with a series of tap holes 7 and 8, respectively, the tap holes 7 on the bottom rails I being in vertical alignment and equally spaced with the tap holes 8 in the top rails 3. The tap holes in both the bottom and top rails are utilized to secure bracket members 9 to the section L (see Figs. 3 and 4 of the drawings), such brackets 9 serving as bearing brackets for the driving sprocket wheels or for supporting other mechanisms utilized in the operation of the machine. Due to the fact that the tap holes 7 and 8 are arranged in the manner described, the brackets 9 may be shifted to any desired position relative to either one of the sections L or to the machine as a whole.

Provided in each of the top rails 3 of the section L is a longitudinally extending recess or slot 102. The inner end of each slot 102 is enlarged to give the slot a substantially inverted T-shaped form in cross-section. The slots 102 serve as a means for connecting the base of the device or unit mounted on the section L to the latter. As a typical example of the manner in which this is accomplished, reference is made to Figs. 6 and 7 of the drawings which illustrate in detail portions of the feed control unit C. It will be observed from such figures that this unit is mounted on a pair of base rails 100, 100 which extend longitudinally of the machine and which in cross-sectional area have a substantially T-shape form. Extending lengthwise along the bottom surface of each of the rails 100 is a rib or key member 101 adapted to be received in the upper narrow portion of a slot 102 provided in the top rail 3 of the section L. Extending also through apertures in the base rails 100 are bolts, note the bolts designated 104 in Figs. 10 and 11 of the drawings, which are inverted in position and have their heads disposed in the enlarged portions 103 of the slots 102. The heads of the bolts are therefore retained in the slots 102 of the section L by the longitudinally extending flanges formed by the enlarged portions 103 of the slots 102 and the opposite threaded ends of the bolts 104 which extend upwardly above the base rails 100 are provided with locking nuts. The base rails 100 of each unit are each provided also with a positioning hole intermediate its ends (see for example, the hole designated 105 in Fig. 5 of the drawings) through which a pin is inserted during the adjustment of the unit on the section L, and into one of a series of holes 106 provided in the upper surfaces of the associated top rail 3 of the section L, to properly position the unit on the section L. As is illustrated in Fig. 31 of the drawings, the holes 106 in each top rail 3 are close together and, in the actual machine, should be spaced approximately one inch apart so that substantial accuracy of the unit with respect to the section L upon which it is mounted may be obtained before the nuts on the bolts 104 are tightened to secure such unit on its respective section or sections L.

It will be evident from the foregoing that the sections L, due to their similarity of construction, may be readily removed or interchanged. As each unit of the machine is completely mounted upon one or two of these sections, such unit can be removed or shifted to another portion of the machine with ease. Furthermore, due to the slidable connection of such units with the sections, the former may be readily adjusted relative to the other units with little trouble. It will be understood that each of the units of the machine is complete in itself and that each is provided with base rails 100 of substantially similar design so that the aforementioned purposes may be accomplished. As has been pointed out also, the various bearing brackets 9, by reason of the construction described, can be readily adjusted to any desired position.

Before entering into a detailed description of the construction of typical units, it is considered advisable at this time to point out in a general fashion the mechanism by which such units are operated. The machine illustrated in Fig. 1 of the drawings may be driven by one or two motors which are positioned in proximity to the machine and which are connected in any suitable fashion to the main driving shafts 10 and 11. The shafts 10 and 11 are supported by bearing brackets 12, 12 which are secured to adjacent sections L of the machine through the medium of the tap holes 7 provided in the bottom rails 1 of such sections. The brackets 9, however, as has been previously pointed out, are secured to the sections L through both the tap holes 7 of the bottom rails of such sections and the tap holes 8 provided in the top rails 3 of such sections. The main driving shaft 11 drives the units C, D, E, F, G, and J in the machine illustrated in Fig. 1 of the drawings, while the main driving shaft 10 drives the units K, D", E", F' and H' of such machine. Referring to Figs. 1 and 3 of the drawings, the driving shaft 11 is connected to the applying unit D by means of a dual sprocket wheel 13 which is mounted on shaft 11 and is engaged by a chain 14 which passes around the idler sprocket wheels 20, 19 and 15 in its cycle of movements. The sprocket wheels 15 and 19 are spaced on either side of a sprocket gear 16 in such manner as to maintain the chain 14 in engagement with such gear. The sprocket gear 16 is mounted on the shaft 17 of a variable speed gear device 18 of known construction. The driven stub shaft 44 of the device 18 carries a sprocket gear 45 which supports one end of a chain 46, the other end of such chain being carried on a sprocket wheel 47 provided on shaft 48 of the coating unit. The other chain attached to the dual sprocket wheel 13, namely, chain 21, passes around a dual sprocket wheel 22 mounted on a shaft which is rotatably supported on a pair of bearing brackets 9 attached to the side frame members of one of the sections L in the manner previously described. Also engaged with the sprocket wheel 22, is a chain 23 which moves in a substantially clockwise direction, as viewed in Fig. 3 of the drawings, and which in its movements from the sprocket wheel 22 passes over an idler sprocket wheel 24 and then under a dual sprocket wheel 25. The driven sprocket wheel 25 is also drivingly connected, by means of a chain 26, to a sprocket wheel 27 mounted on the shaft which supports the oscillating distributing roller E. After leaving the sprocket wheel 25, the chain 23 passes around a sprocket wheel 28, then upwardly in a substantially vertical direction to a sprocket wheel 29 mounted on shaft 30 of the controlling mechanism C". From the sprocket wheel 29, the chain 23 passes into engagement with a sprocket wheel 31 mounted on the shaft 32 of the unit G and through such shaft drives a sprocket wheel 40, chain 41, and sprocket wheel 42, which is mounted on shaft 43 of the polishing unit F. From sprocket wheel 31 of the unit G, the chain 23 passes to a sprocket wheel 33 mounted on a shaft 34 which carries a friction roller 35 for feeding and guiding the paper from the unit G to the unit J. At the unit J the chain 23 passes around a sprocket wheel 36 mounted on shaft 37 of such unit and then passes downwardly into engagement with a sprocket wheel 38 mounted on shaft 39 of the control unit C, the chain returning from the sprocket wheel 38 to the sprocket wheel 22.

The driving shaft 10 is provided with a sprocket wheel 50 through which it imparts to a chain 51 in engagement with wheel 50, movement in a clockwise direction, as viewed in Figs. 1 and 4 of the drawings. In its travel from the sprocket wheel 50, the chain 51 passes over a dual sprocket wheel 52 which is connected also by means of chain 53 to a sprocket wheel 54 mounted on shaft 55 of the oscillating distributing unit E". The chain 51 then passes under an idler sprocket wheel 56 and then upwardly over the idler sprockets 57 and 61 which are disposed on either side of a sprocket wheel 58 mounted on shaft 59 of a variable speed gear device 60, the sprockets 57 and 61 being so positioned with respect to sprocket wheel 58 that the latter is engaged by and driven by chain 51 in its travel. The change speed gear device 60 drives the coating unit D" through stub shaft 77, sprocket 78, chain 79, and sprocket wheel 80 which is mounted on shaft 81 of the coating unit D". From sprocket wheel 61, the chain 51 passes in its travel under an idler sprocket 62, then upwardly around a sprocket wheel 63 mounted on shaft 64 of the cooling unit K. From the cooling unit K, the chain extends over to the cooling unit H' where it engages sprocket wheel 65 provided on shaft 66 of cooling roller 67, then passes into engagement with sprocket 68 on shaft 69 supporting the cooling roll 70, then under sprocket wheel 71 on shaft 72 of the cooling roll or drum 73, then upwardly around sprocket wheel 74 mounted on shaft 75 of the cooling roll 76, and thence back to the sprocket wheel 50 on shaft 10. The polishing unit F" is driven from shaft 69 of the cooling roll or drum 70, through sprocket wheel 82 mounted on such shaft, chain 83, and sprocket 84 mounted on shaft 85 of unit F". The take-up reel 89 of unit M is driven from the cooling roll 73 by sprocket 86 mounted on shaft 72 of such roll, chain 87, and a sprocket wheel mounted on shaft 88 of the take-up reel.

Considering now in greater detail the construction of the several units in the order in which they perform their operations on the paper strips A and A' as the latter pass from their supply rolls B and I, respectively, to the take-up unit M, and referring more particularly to Figs. 3 and 5 to 9 of the drawings, the units C and C" which control the tension of such paper strips through the machine and which are similar in construction, are each, as has been previously explained, mounted upon a pair of base rails 100 by which they are secured to the sections L of the machine. The base rails of each of the units C and C" are each provided with four standards 110, 111, 112 and 113, each of which may be marked with a series of graduations 121 in designating units of linear measurement, as is indicated more clearly in Fig. 5 of the drawings, so that the parts supported by such standards may be accurately adjusted relative to the same. The standards 110, 111, 112, and 113 on each base rail 100 are connected at their upper ends by a head member 114 which extends longitudinally of the machine, the two head members of the unit being braced or connected together by cross-bars. Slidably mounted on the pair of standards 110, 110 are a pair of bearing brackets 115, 115 which rotatably support an idler or guide roller 117 while the pair of standards 111, 111 are provided with slidable bearing brackets 116, 116 which carry the idler or guide roller 118. Associated with the standards 110 are a pair of vertical threaded bars 119, 119 which are in threaded engagement with threaded passageways provided in the bearing brackets 115, 115. Similarly, the standards 111 have associated therewith threaded bars 120, 120 which extend up through and are in threaded engagement with the bearing brackets 116, 116 slidably mounted on the standards 111, 111. Supported on the two intermediate pairs of standards 112, 112 and 113, 113 is a roller 122 and a roller 123. The roller 123 is a hollow roll and is provided on its exterior surface with a relatively thick coating of rubber 124. The shaft 39 of the hollow rubber coated roller 123 is rotatably supported by a pair of bearing brackets 128, 128, each of which is fixed to the standards 112 and 113 which are disposed on the same side of the machine. The rotatable shaft 39 is provided with a longitudinally extending bore through which extends a fixed shaft member 127. The shaft member 127 is supported at one end relative to the shaft 39 by means of a thrust and roller bearing unit 129, while its other end extends through and is in threaded engagement with the end wall of a cap member 130 which is fixed against rotation by means of an arm 137 which, at its outer end, extends into a forked bracket 138 mounted on the adjacent standard 112. The cap 130 encloses the adjacent outer end of shaft 39 and is connected thereto by means of a bearing unit of suitable construction, as can be more clearly seen in Fig. 6 of the drawings. Adjacent to the cap 130 is positioned a clutch collar 131, which is rotatably mounted on the end of shaft 39 by means of the bearing units 132, 132. The clutch collar 131 has secured thereto the sprocket wheel 38 to which rotative movement is imparted from the main shaft 11 and has an external flange at its inner end which opposes a clutch disc 133 secured to shaft 39 and bearing an annular friction plate or member 134. Intermediate the clutch disc 133 and the adjacent bearing unit 132 of the clutch collar 131, is a compression spring 135 which normally tends to keep the friction plate 134 carried by the clutch disc 133 out of engagement with the flange of the clutch collar 131.

The roller 122 is likewise a hollow roller made of suitable metallic material, such as steel, and is provided with stub shafts 139, 139 formed integrally with the ends of such roller and rotatably mounted in the split bearing brackets 140, 140 slidably secured to the standards 112 and 113 on each side of the machine.

It will be seen from the foregoing description that roller 122 is freely rotatable in its bearing brackets 140, 140, while roller 123 is retarded against free rotational movement by the clutch members 133, 133 and 134. As in the operation of the machine, roller 123 and consequently clutch members 133 and 134 will be rotating in the same direction as the clutch member 131 which is positively driven by the driving chain 23 through the sprocket 38, but at a slower rate of speed than the speed of rotation of clutch members 133 and 134, the clutch members 134 and 131 will be rotating in the same direction but moving relative to one another so that a sliding action will take place between the face of clutch member 134 and the engaging face of the external flange on clutch member 131. The rate at which this sliding or braking action takes place will depend upon the difference in rotational speeds of the clutch members 131 and 134 and the pressure with which clutch member 134 bears on the face of the external flange on clutch member 131. This pressure may be varied by adjusting the hand wheel 136 provided on one end of shaft 127 to vary the pressure of the cap member 130 on the clutch member 131 through their associated bearing units.

Rotational movement is imparted to the rollers 122 and 123 through the medium of the strip of paper which passes therebetween and which is advanced through the machine by reason of its frictional engagement with the exterior surfaces of the positively driven relatively large drums in the units G, J, K and H'. The spacing between the rollers 122 and 123 should be such as to eliminate all slippage of the paper as the paper is drawn therebetween by the feeding drums. As a consequence of the retarding or braking action of clutch members 131, 133 and 134 and the gripping action of the rubber coated surface 124 of roller 123 on the paper web, which coating possesses high frictional qualities, the paper web between the feeding drums and the retarding rollers 122 and 123 is placed under tension. The adjustment of the several parts will vary with different types of paper and with the rate at which the paper is to be fed, but in each case the surface speed of the rollers 122 and 123 should be such that with a particular type of paper fed at a given speed, for example, from 300 to 350 feet per minute, there will be exerted a predetermined constant tension on the paper strip. This factor is important for if the tension on the paper is maintained constant the subsequently applied coating will be constant, that is, of uniform thickness. Preferably also the tension placed on the paper should be high. Good results were attained when the tension on the paper was so high that the portions of the web spanning the several rollers assumed an undulated appearance in which the wave-like formations extended longitudinally of such portions. Before passing to a description of the mechanisms for adjusting the roll 122, it should be noted also that the guide rollers 117 and 118 associated with the rollers 122 and 123, are positioned so that their axes of rotation are approximately on the same horizontal level as the axis of rotation of the roller 122, thus presenting only a small section of the paper to be engaged by the rubber surface of roller 123. As a result of this arrangement, there is an elimination of wrinkles on the strip of paper.

Adjustment of the roll 122 relative to the roll 123 is attained by means which permit of minute adjustments as between such rollers, such means including bosses 141, 141 integrally formed with the upper halves of the split bearing brackets 140, 140 and rods 142, 142 which are threadedly secured at their lower ends to the bosses 141, 141 and extend upwardly through the head members 114, 114 at the top of the unit. The upper projecting ends of the rods 142 are provided with horizontally disposed worm wheels 143, 143 which are integrally threaded and are in threaded engagement with the ends of rods 142, 142. The exterior surfaces of the worm wheels 143, 143 are engaged with worms 144, 144 mounted on the ends of a shaft 145 extending transversely across the unit, as is illustrated in Fig. 3 of the drawings. The shaft 145 is rotatably mounted on a pair of bearing brackets 146, 146 provided on the two head members 114, 114 and is provided with a hand wheel 147 by which adjustment may be made of the roller 122 relative to the roller 123. The foregoing mechanism being micrometrical in nature permits of exact and minute adjustment of the roller 122 relative to roller 123.

Adjustment of each of the idler or tensioning rolls 117 and 118 is obtained through the threaded rods 119, 119 and 120, 120, each of which is provided at its upper end with a miter gear 148 which engages with miter gears 149 provided at the ends of the two transverse shafts 150, 150 positioned above the head members 114, 114 (see Figs. 3 and 7 of the drawings). Each of the transverse shafts 150 is rotatably supported by a pair of bearing brackets 151, 151 provided on the head members 114, 114, as is illustrated more clearly in Fig. 7 of the drawings. Connected to each of the shafts 150 is a hand wheel 152 by which adjustment can be made of the bearing brackets 115 relative to the threaded rods 119 and 120 and consequently the standards 110 and 111. As is shown in Figs. 7 and 9 of the drawings, each of the shafts 150 is composed of two separate portions which are connected together by means of a coupling unit including a coupling member 153 keyed for longitudinal movement only on the end of the shaft portion 150' and normally secured in position on such shaft portion by means of a set screw 155 and a coupling member 154 which is secured to the other shaft portion 150'' by means of a transverse pin. Each of the opposed ends of the coupling members 153 and 154 is provided with an annular set of teeth adapted to interengage with one another to lock the two portions of the shaft together so that they may be operated as a unit to adjust both bearing brackets 115, 115 of the tension roller 117 or 118 with which they are associated in a vertical direction simultaneously. Should it be desired, however, to actuate one of the shaft portions 150', 150'' independently of one another, all that is necessary is to unloosen the set screw 155 and slide or withdraw the coupling member 153 keyed to the shaft portion 150' out of interlocking engagement with the teeth of the coupling member 154. When this is accomplished, movement of the bearing bracket 115 relative to the threaded rod 119, on the left hand side of the unit, as viewed in Fig. 7, will be accomplished, the bearing unit on the right hand side of such figure being unaffected. In this way differences in the height of the bearing brackets associated with each tension roller, as will be indicated by the graduations on standards 110 and 111, can be corrected. When this is accomplished, the two coupling members 153 and 154 are again united in interlocking engagement and the member 153 secured in position on shaft portion 150 by again tightening the set screw 155. The two bearing brackets associated with the roller will then again be lifted and lowered as a unit as the hand wheel 152 associated therewith is rotated.

Each of the guide or tension rollers 117, 118 is provided with a longitudinally extending bore 156 through which extends a heating element 159, as is shown more clearly in Fig. 8 of the drawings. The element 159 is supported at its ends on the ends of the shaft members of the roller by means of a ball bearing coupling units, each of which includes an outer sleeve 157 secured to the end of the shaft member and an innner sleeve 158 secured to the end of the heating element 159, the sleeves 157 and 158 of each coupling unit having therebetween a bearing unit 160. The heating element 159 is secured against rotation by means of the slotted cross brackets 161, 161 which are made of Bakelite or other suitable insulating material and are connected by stud bolts 162 to the associated bearing brackets 115, 155, in the case of roller 117 and to bearing brackets 116, 116 in the case of roller 118. The heating unit is provided at one end with an electrical connection adapted to receive an electrical plug 163 by which it may be connected to a source of electric current, as is illustrated in Figs. 7 and 8 of the drawings. Thus both the guide or tension rollers 117 and 118 of the tension control unit C are heated to prepare the paper for the material applied by the unit D which will next be described. Before taking up the description of unit D, however, it is to be pointed out that while the unit C only has been hereinabove considered, the description thereof applies equally well to unit C'' which is of similar construction.

The unit D and other units yet to be described in detail are similar in many respects to the tension control units C and C'' and accordingly, in an effort to simplify the description of this machine, those parts of such units which are similar to corresponding parts in units C and C'' have been given like reference characters. Like the tension control units C and C'', the unit D includes two base rails 100, 100 by which the unit is secured to the top rails 3 of the two sections L which the unit straddles and from each of which extend upwardly the four standards 110, 111, 112, and 113 and the threaded rods 119 and 120. Slidably mounted on standards 110, 110 and threadedly engaged with rods 119, 119 are bearing brackets 115, 115 supporting the guide or tension roller 117. Slidably mounted on standards 111, 111 and threadedly engaged with rods 120, 120 are bearing brackets 116, 116 supporting the guide or tension roller 118. The rollers 117 and 118 are adjusted as to position on the standards 110 and 111 through the rods 119 and 120, respectively, and the mechanism associated therewith which has been described in detail in connection with unit C.

On the two intermediate pairs of standards 112 and 113 are slidably mounted the split bearing brackets 140', 140', which are somewhat similar in construction to the split bearing brackets 140, 140 of the unit C and, like the latter, are provided with bosses 141, 141, to which are connected mechanisms similar to that described in connection with unit C for adjusting the positions of the brackets 140', 140' on the standards 112 and 113. The split bearing brackets 140', 140' differ from the bearing brackets 140, 140 of unit C, in that, they are provided with bosses 165, 165 (see Fig. 15), through which extend tie or strap bolts 166 which, at their lower ends, extend through bosses 167 provided in the bearing brackets 168 which are slidably mounted also on the standards 112 and 113. Intermediate the bearing brackets 140' and 168 and encircling the standards 112 and 113, are compression springs 169 which function to maintain the two brackets in proper spaced relation. It will thus be seen that the brackets 140' support the lower brackets 168, the brackets 140' and 168 associated with each pair of standards 112 and 113 functioning as a unit and, as a unit, being adjustable relative to the standards 112 and 113 through rod 142, worm wheel 143, worm 144 and hand wheel 147, to vary the position of such unit with respect to a pan 170 which is mounted on the section or sections L associated with such unit, as is shown more clearly in Figs. 10 and 11 of the drawings. The bearing brackets 168, 168 rotatably support a shaft 171 upon which is provided a roller 172 arranged to pick up coating material carried in such pan and to deliver it to the knurled coating roller or drum 173 mounted on shaft 48, which is rotatably supported by the bearing brackets 140', 140'. As has been previously explained, shaft 48 is provided at one end with a dual sprocket wheel 47 through which rotational movement is imparted to such shaft and consequently drum 173 from the variable speed device 18. The other end of shaft 48 is provided with a gear 174 (see Figs. 11 to 13) which meshes with a gear 175 provided on shaft 171 to rotate roller 172. Both shafts 48 and 171 are hollow shafts and through the bores of such shafts extend heating units 176 and 176', respectively. Like the heating unit illustrated in connection with the roller 117, the heating units associated with shafts 48 and 171 are supported therein by means of coupling units which include outer sleeves 177 and 177' secured to the ends of the shafts and inner sleeves 178 and 178' secured to the ends of the heating devices, the sleeves 177 and 178 and sleeves 177' and 178' being revolvably connected by bearing units, such as, the bearing unit 179 illustrated in Fig. 13 of the drawings. The heating units 176 and 176' are secured against rotation by means of transverse brackets 180 and 180', respectively, bracket 180 being secured to one of the bearing brackets 140' and extending around the edge of gear 174, while bearing bracket 180' is secured to one of the bearing brackets 168 and extends around gear 175, as is shown more clearly in Fig. 12 of the drawings. Like the heating unit previously described in connection with roller 117, the heating units 176 and 176' of the rollers 172 and 173 provided on one end with electrical connections 181 and 181' adapted to receive suitable electrical plugs by which the heating units may be connected to a source of electrical energy.

Associated with the knurled roller 173, is a doctor blade 182 made of a strip of flexible metal material, such as steel. Along the lower longitudinal edge of the blade 182 are provided a series of notches or slots 183 by which the blade 182 is seated on a series of studs 184 attached to the upper ends of a plurality of flexible fingers 185, see Figs. 25 and 26 of the drawings. Each of the fingers 185 is provided at its lower end with an aperture through which extends a clamping stud bolt 186 which extends also through an opening provided in a transversely extending oscillating rod 187. The fingers 185 are secured in position on the bolts 186 against a face of the oscillating rod 187 by means of nuts 188 and 189. Also mounted on each of the stud bolts 186 is a U-shaped member 190 having one leg bearing against the face of the rod 187 against which the fingers 185 are secured and below the bottom end of its associated finger. The upper legs of the members 190 rest against the fingers 185 at a point intermediate the stud bolts 184 carried thereby and the oscillating rod 187. The members 190 are secured in position by means of nuts 191 which are threaded on bolts 186 and through such nuts 191 may be adjusted to vary the positions of the fingers 185 to bring all portions of the longitudinal length of the doctor blade 182 into proper position relative to the knurled roller 173. Thus the wiping edge of the doctor blade 182 may be adjusted to bear evenly with a yielding pressure against the knurled roller 173 throughout its entire length, simply by varying the adjustment of the nuts 191 and the U-shaped members 190 associated with each of the fingers 185 supporting the blade.

The oscillating rod 187 at its outer ends is cylindrically formed and is rotatably supported on the supporting brackets 192 secured to bearing brackets 140', 140', see Fig. 11 of the drawings. Secured to one end of the oscillating rod 187 (see Figs. 11 to 13) is a collar 193 from which depends an arm 194 having attached to its outer end an offset weight 195, whereby a biasing pressure is applied to the oscillating rod 187 in such manner as to maintain the doctor blade 182 up against the knurled face of the roller 173. To the other end of the oscillating rod 187 (see Figs. 14, 15 and 27) is secured a strap or split bracket 197 whose portion 197' encircles an annular cam 196 secured to the adjacent end of shaft 171. The cam 196 has formed in the exterior face thereof an internal cam groove 201 within which is received a cam roller 200 provided on the interior of the portion 197' of the strap or split bracket 197. The portion of the split bracket 197 connected to rod 187 includes a pin 199 which extends into an annular slot 198 provided in the rod 187, whereby the split bracket 197 is rotatably movable relative to the rod 187 but is fixed against movement in a direction longitudinally of such rod. Thus when the shaft 171 is rotated through the gears 174 and 175 the cam 196 will, through the cam roller 200 and bracket 197, cause the rod 187 to be shifted in a lengthwise direction to impart to the doctor blade 182 mounted thereon a lengthwise movement of an oscillating nature. The movement of the blade 182 by reason of such arrangement has a range of approximately one-half inch in either direction, which is sufficient to prevent any irregularities in the applied coating of material.

The pan 170 into which the lower roller 172 extends has, as is illustrated more clearly in Figs. 28 to 30 of the drawings, an inclined bottom so that the material to be applied, when placed in the rear portion of the pan and melted, will be caused to flow toward the front end thereof. The bottom surface of the pan is composed of an inclined portion 202 which slopes away from the rear wall of the pan towards the front wall 204 thereof to a region spaced from the latter and a portion 203 which inclines upwardly from the bottom of portion 202 to the front wall 204, thereby providing a transversely extending trough-like portion for the reception of the roller 172. Intermediate such trough-like portion of the pan 170 and the rear wall of such pan are a plurality of ribs or fins 205 which are integral with the inclined portion 202 of the pan. The fins 205 are in staggered relation so as to retain the material in the region of such fins until melted to a consistency which will permit it to flow to the trough-like portion. The proper fluidity of the material is attained by means of an electrical heating unit 206 which is secured to the bottom of the pan 170, as is shown in Fig. 11 of the drawings, and the heat from which is transmitted to the fins 205 integral with such bottom.

It will be understood from the foregoing description of the unit D that the material which is maintained in the pan 170 at the proper consistency or fluidity for best results, is picked up by the heated roller 172 and fed to the heated knurled roller 173 which by reason of the driving arrangement, rotates in a direction opposite to that of the roller 172. As the roller 173 with the applied material moves past the doctor blade 182, the latter, due to the pressure of weight 195, wipes the material from the face of the roller leaving only that portion of the material which is contained in the substantially conical or pyramidal-shaped depressions formed in its knurled face. The depressions which have a radial depth of approximately $\frac{1}{32}$ of an inch, are positioned close together so that their outer edges are relatively thin and common to adjacent depressions. Due to the oscillating movement of the spring-like doctor blade which bears with equal pressure across the entire face of the roller 173, the material is uniformly applied to the roller 173 and uneven application and wearing of the walls of the depressions is prevented. After the roller moves past the doctor blade it comes into contact with the strip of paper A which is pressed down against the upper surface thereof by the rollers 117 and 118. As the paper passes over the roller 173, it sucks the portions of applied material out of the depressions. This action is not due to any great extent by the absorptive capacity of the surface of the paper, which may indeed be entirely lacking in absorptive qualities, but to the fact that the paper which is cooler than the applied material causes the exposed surfaces of the portions of such material in the depressions to become sufficiently tacky as to adhere to the paper. Due to this adherence of the applied material to the paper and the heat of the roller which lowers the viscosity of the surfaces of the portions of the material in engagement with the walls of the depressions, the depressions are practically cleaned out entirely of their charges. The speed of rotation of the roller 173 is less than the speed of feed of the paper so that the paper slides over the surface portion of the roller 173 with which it is engaged. This sliding movement of the paper causes the material taken from the depressions to be smeared in a longitudinal direction upon the surface of the paper. The thickness of these smeared lines of material will depend to some extent upon the speed of rotation of roller 173 and to that extent is proportional to the speed of the roller. Thus the greater the speed at which roller 173 rotates the thicker will be the material applied to the surface of the paper strip. The speed of the roller, as has been previously indicated, is controlled by the variable speed gearing mechanism designated 18.

It will be understood that the foregoing description of unit D applies equally well to the similarly constructed unit D'' so that a description of the latter unit is unnecessary.

From the knurled roller 173 of the unit D the paper passes to the oscillating distributing unit E where the applied material is evenly distributed over the entire surface of the paper strip to form a smooth layer on the latter. The oscillating distributing unit E includes three standards 110, 112 and 113 provided on each of the foot rails 100, the standards 111, 111 being omitted from this unit as it is provided with only one tension or idler roller, namely, the roller designated 117. The roller 117, bearing brackets 115, 115 and the associated adjusting mechanism are similar to corresponding parts previously described in connection with units C and D. Unit E differs also from the previously described units in that the mechanism between standards 112 and 113 is supported directly on such standards. This mechanism includes a hollow distributing roller 210 (see Figs. 3 and 16 to 18) mounted on a hollow shaft 209 to which the driven sprocket wheel 27 is attached. The shaft 209 is slidable and rotatably supported by a pair of bearing brackets 217, 217 secured to the standards 112 and 113. Extending through the roller 210 and shaft 209 thereof is an electrical heating unit 211 which is connected at each end to the shaft 209 by a ball bearing unit which is similar in construction to those illustrated in connection with roller 117 and the outer and inner sleeves of which are designated by the reference numbers 212 and 213, respectively. On the left-hand end of the heating unit 211, as viewed in Figs. 16 and 17 of the drawings, there is secured a cross bracket or clamp 214 made of suitable insulating material and connected by a tie-rod or bolt 215 to the adjacent bearing bracket 217 and by a tie-rod or bolt 216 to the outer end of an arm 218 integrally formed on such bearing bracket. The clamp 214 is slidably connected to the rods or bolts 215 and 216 so that it is movable relative to such rods and is in the nature of a sliding yoke. In this manner the heating unit 211 is fixed against rotational movement by shaft 209 but is movable lengthwise with the latter. The arm 218 carries on its outer end a cam roller 219 which engages in the cam groove of an annular cam 220 mounted on and secured to shaft 209. Thus as shaft 209 is rotated through sprocket wheel 27 and associated driving mechanism, it will be shifted lengthwise by the arm 218, cam roller 219 and cam 220. The cam 220 is so designed that the longitudinal movement of the distributing roller 210 will be from one-quarter to three-eighths of an inch in one direction. As a result of this reciprocating movement of roller 210, the more or less streaked lines of material applied by unit D will be spread evenly over the entire transverse width of the paper strip. This spreading action of roller 210 is rendered more effective by the rotational movement of the roller which is slower than the speed of feed of the paper and in a direction opposed to the paper feed. Due also to the fact that roller 210 is heated to a higher temperature than the melting point temperature of the material applied to the paper strip, this spreading action is facilitated and the roller 210 exerts also a polishing action on the material. As a result of this construction, the material leaving roller 210 will be even and of uniform thickness to the side edges of the paper web, thereby making it unnecessary to cut strips off the sides of the web to attain this condition as is now common practice in the art.

The paper leaving the distributing roll 210 next passes to the unit F where the applied material is further smoothened and polished. In this unit the standards 112 and 113 of the previously described units are omitted, the single tension or idler roller 117 being mounted on standards 110 and threaded rods 119 and the smoothing and polishing mechanism being mounted on standards 111 and threaded rods 120. The adjusting mechanisms associated with threaded rods 119 and 120 are similar in all respects to the adjusting mechanisms associated with correspondingly numbered parts in unit C and a description of such parts is therefore not deemed necessary to be repeated for an understanding of their operation.

The polishing mechanism associated with standards 111 and threaded rods 120, includes a pair of split bearing brackets 225, 225 which are slidably engaged with standards 111, 111 and threadedly engaged with the threaded rods 120, 120 by which adjustment of such brackets and consequently the mechanism supported thereby may be made. As is shown more clearly in Fig. 20 of the drawings, the brackets 225, 225 are fixedly secured to a hollow shaft 43 through which extends a heating unit 226 provided at one end by an electrical plug connection 227 and supported in proper position with respect to the shaft 43 by means of the closure caps 228, 228 provided on the ends of such shaft. Secured to the fixed shaft 43 intermediate the bearing brackets 225, 225, is a sleeve 229 made of aluminum or other suitable material. The sleeve 229 is provided at its lower end with an integrally formed enlarged portion 230 of sufficient size and weight to function in the nature of a reservoir to retain the heat imparted by the heating element 226 and to cause such heat to tend to rise up into the longitudinally extending fins 231 projecting from the upper end of the sleeve 229 (see Figs. 22 and 23 of the drawings). Each of the fins 231 carries a roller 232 of relatively small diameter as, for example, one-quarter of an inch diameter. The upper or outer end of each of the fins throughout its entire length is provided with a U-shaped recess within which is positioned a U-shaped bushing or channel member 233 adapted to receive the rollers 232, as is shown more clearly in Fig. 24 of the drawings. Secured to the ends of the fins 231 are a pair of bearing plates 234 and 235 through which the ends of the several rollers 232 extend, one end of each of the rollers being provided with a collar 236 to prevent movement of such rollers relative to the fins in one direction. The other ends of the rollers 232 are each provided with a pinion gear 237 which meshes with a relatively large external gear 238 swedged on the outer race 239 of a bearing unit secured in position on the shaft 43 between the sleeve member 229 and a bearing plate 240 which is keyed to the shaft 43. Rotatably mounted on the bearing plate 240 and a bearing plate 243, on the other side of the adjacent split bearing bracket 225, is a shaft 242, which at one end is provided with a gear 241 meshing with the gear 238 and at its other end with a gear 244 meshing with a large external gear 245 formed on the outer surface of a relatively wide collar 246 secured to the outer race 247 of a bearing unit. This bearing unit is secured in position on shaft 43 by the bearing plate 243 and a retaining plate member 248 provided on the left hand cap member 228, as viewed in Fig. 20 of the drawings. Secured to the exterior surface of the collar 246 adjacent to the gear 245 formed thereon, is the sprocket wheel 42 which is engaged by the driving chain 41.

It will be seen from the foregoing that rotative movement imparted to the sprocket wheel 42 by the chain 41 causes rotational movement of the gear 245, and through the latter and gears 244, shaft 242, gear 241, gear 238 and gears 237 causes rotational movement of each of the rollers 232. The drive of rollers 232 is so arranged that such rollers rotate in the same direction as the direction of feed of the paper but at a speed slower than and preferably about one-half the speed of feed of the papers. As the paper passes over the rollers 232, the latter will engage the layer of material thereon along substantially narrow transverse lines due to the small diameter of such rollers, such line contact being substantially equal throughout the entire width of the paper because of the support afforded the rollers throughout their lengths. Thus the applied material will be subjected to successive lines of working contact by the rollers 232 and, through the latter, will be submitted to a smoothing and polishing action. As the rollers 232 are heated the surface of the applied material will be made exceedingly smooth and will attain a polished effect. The polished surface furthermore will not be streaked or marred by particles in the material, due probably to the fact that the small contacting surface of the rollers enables them to pick up such particles without marking the layer and to apply them again to the surface of the material at a point beyond their lines of working contact with the material. The number of rollers which will come into engagement with a particular layer of material will depend on the latter's viscosity. If the viscosity of the applied material is high, the positions of the arcuately arranged rollers will be adjusted so that a greater number of them will engage the applied material than when a material of less viscosity is applied to the paper strip. Adjustment of the rotating rolls 232 relative to the paper passing thereover is attained through a handle 250 which is integral with a collar 249 secured intermediate the right-hand cap 228, as viewed in Fig. 20 of the drawings, and the adjacent bearing bracket 225. This operation is accomplished by first releasing or loosening the split bearing brackets 225, 225.

The paper passing from the unit F next passes around the roller or drum 253 of unit G where a second strip of paper from the supply roll I is applied to the layer of material on the paper strip A. In its passage from the roller I, the second strip of paper A' passes through the tension control unit "C" which is similar in construction and operation to the previously described control unit C, the paper strip in its feed through such unit passing over idler roll 117, then between the rollers 122 and 123 and then under the tension or idler roller 118, from whence it passes to roller 253. Roller 253 is similar in construction to roller 254 of unit K and rollers 67, 70, 73 and 76 of unit H', and each of these rollers or drums is rotatably supported by a pair of suitable bearing brackets 251, 251 which are slidably mounted on standards 252 rising from base rails of the same construction as the base rails 100 of the previously described units and being attached to a section L of the machine in a similar manner, as will be evident from Figs. 3 and 4 of the drawings. In view of the similarity of construction of rollers 253, 254, 67, 70, 73 and 76, it is believed necessary to describe only one of these rollers in detail, it being understood that such description will apply equally well to all of these rollers. Referring now to Fig. 33 of the drawings which illustrates roller 70 by way of example, it will be seen that roller 70 is composed of a hollow drum suitably mounted on hollow shaft members 69 and 69' which are rotatably supported by the bearing brackets 251, 251. Extending through shaft member 69 and into drum 70 is an inlet pipe 260 whose outer end is provided with an elbow to which may be connected one end of a flexible hose 261 leading to a source for heating or cooling materials, such as brine or steam. The pipe 260 may be connected to the outer end of shaft member 69 by means of a stuffing box composed of a coupling sleeve 262 secured to the end of shaft 69 and a gland 263 which, through its cylindrical central portion, bears against the stuffing members 264 surrounding the pipe 260 and which is connected to the coupling sleeve 262 by tie bolts, as is well known in the art. Through the other shaft member 69' extends an outlet pipe 265 which is connected to the end of such shaft member by a stuffing box which is designated generally by the numeral 266 and which is similar in construction to the stuffing box on shaft member 69. The outer end of pipe 265 is provided with an elbow to which is attached a hose 267 for conveying away to a place of discharge the material passing out through the outlet pipe 265.

In the case of the roller 253 in unit G, steam is supplied to heat the roller and consequently the coating material on paper strip A, thereby maintaining such coating material in a softened or tacky condition while the second strip of paper A' is being applied thereto. The two combined sheets of paper A and A' pass from the roller 253 over a friction or guide roller 35, which is rotatably supported by bearing brackets mounted on the head members 114, 114 of unit F, and thence between the nipping or squeeze rollers of unit J where the two strips of paper are united by pressure.

The unit J is mounted on a pair of supporting rails 270, 270 positioned above the variable speed unit 18 and connected at their ends to the threaded rods 120 of unit D and the threaded rods 119 of unit C, as can be seen more clearly in Fig. 3 of the drawings. Rising from each of the supporting rails 270, 270 are a pair of standards 271, 271 which form supports for the bearing brackets 272, 272 which rotatably support shaft 37. The shaft 37 carries a cooling roller 273 which is similar in construction to the cooling roller 70 previously described. Associated with cooling roller 273 is a nip or squeeze roller 276 which is mounted on a shaft 275 rotatably supported by the split bearing brackets 274 which are slidably connected to the standards 271. Adjustment of the nip or squeeze roller 276 relative to roller 273, is attained by threaded bars 278, 278 which are secured at their lower ends to the bosses 277, 277 provided on the bearing brackets 274, 274 and which extend upwardly through brackets provided in the head bars 279, 279 mounted on the upper ends of the standards or guides 271. The upper ends of the rods 278, 278 are in threaded engagement with worm wheels 280, 280 which engage worms 281, 281 provided on the ends of a transverse shaft 282 which is rotatably supported on brackets provided on the head bars 279 and provided at one end with a hand wheel 283.

From the nip or squeeze rollers 273, 276 the united paper layers or strips pass over the cooling roller 254, thence under the guide roller 117, over the knurled roller 173 and under idler roller 118 of the unit D'', which unit is similar in construction to the unit D previously described. The combined paper layer at unit D'' receives a second layer of material but this time on the other surface of the paper strip A. From unit D'' the composite web passes over the oscillating distributing roller of unit E'', which is similar in construction to unit E, and where the second layer of applied material is distributed evenly over the exterior surface of the united strips. The united strip in its feed then passes over the multiple rollers of unit F'', which is similar in construction to the unit F previously described. The applied material on the exterior surfaces of the united strips having been polished at unit F'' then passes around cooling roller 67, thence around cooling roller 70, thence under and around cooling roller 73, thence around cooling roller 76, and finally is wound up on roller 89 of the take-up unit M (see Fig. 1).

From the foregoing detailed description, it is believed that the construction and operations of the invention will be clearly understood and it will be seen that there has been provided a machine which will in one continuous, uninterrupted operation manufacture the desired composite product with one or more layers of applied material having the desired characteristics, namely, a smooth, polished surface, substantial freedom from air bubbles and uniform distribution throughout its entire area. To accomplish this result, as has been described, the web or compound web is fed at a uniform, continuous rate through the machine and under a predetermined tension. These conditions are established by means of the two rollers 122 and 123 of unit C which are adjusted so as to eliminate all slippage of the paper as the paper is drawn therebetween by the feeding drums and which exert a retarding action against forward feed of the paper such as to place the portions of the paper web intermediate such rollers and the feeding drums under a predetermined, constant, high tension. The roller 122 performs a further function in that it exerts an ironing action on the paper web to eliminate any wrinkles which may have been in the paper. The two idler rollers 117 and 118 associated with the rollers 122 and 123 heat the paper during its engagement therewith. Thus the several rollers of unit C condition the paper for the coating, distributing and polishing mechanisms.

The unit D by reason of the knurled roller 173 and the oscillating doctor blade 182 which bears evenly with a yielding pressure against the knurled roller and is reciprocated across the face of such roller, applies the material in equally distributed, predetermined amounts upon the surface of the paper. As has been explained, the portions of applied material in the depressions of the knurled roller 173 are practically entirely transferred to the surface of the paper web due to the fact that the exterior surface of each portion of applied material in a depression, as it comes into contact with the surface of the paper, becomes more tacky, while the surfaces thereof in contact with the walls of the depression are less viscous due to the high temperature to which the knurled roller is heated. As the surface speed of roller 173 is always less than the speed of feed of the paper, the paper slides over the surface portion of the roller 173 with which it is engaged and as a result the applied material deposited upon the surface of the web is smeared in a longitudinal direction upon the surface of the paper. The condition of the material in which it is applied to the paper web can best be understood by an examination of Fig. 39 of the drawings. In this figure, the reference character a designates generally the layer of material which has been applied to the paper web A. It will be noted that in cross-section the applied material has a serrated appearance produced by the longitudinally extending peaks b and valley c, thus giving the layer a ribbed appearance when observed in plan view. Scattered throughout the material are numerous bubbles d of trapped air which is a condition common to material applied by means of a transfer roller. The thickness of the applied material and also the height of the peaks b will depend to some extent upon the speed of rotation of roller 173. Thus by running the roller 173 at a relatively slow rate of speed the weight of material deposited on the paper web can be as little as three pounds to a ream of five hundred sheets size 24 x 36 inches, while by increasing the speed of rotation of roller 173 sufficiently, one hundred and twenty-five pounds of the material can be applied to a ream of the stated size.

The applied material, when it comes into contact with the reciprocating distributing roller 117 which is heated to a temperature above the melting point temperature of such material, is kneaded and worked so that the peaks b thereof are forced into and fill the valleys c therebetween to bring the applied material to a substantially uniform thickness, as is illustrated in Fig. 40 of the drawings. As a result of this spreading and kneading action of the reciprocating distributing roller 117, the larger bubbles of air in the material are broken (note d''), while the small, minute bubbles are gathered and kneaded into larger bubbles d', some of which are broken by the roller 117 while others pass on to the polishing unit F. The reciprocating motion of roller 117 also assures that the distribution of the applied material will be made substantially uniform throughout the entire area of the web and will not pile up or be of increased thickness along the edges of the strip.

At the polishing unit F, the small diameter heated rollers 232 which are supported throughout their entire lengths so as to exert an even line pressure across the entire surface of the layer of material and which are rotated in the same direction as the direction of feed of the paper but at a surface speed slower than the feed of the paper, exert successive lines of working contact upon the applied material. As a result of this action of the rollers 232, any bubbles of air remaining in the material are substantially eliminated (see Fig. 41), all trace of the peaks b are eliminated so that the material has an even unbroken surface and the surface of the material will be made exceedingly smooth and will attain a polished effect. Thus the applied material will be in a condition that is eminently satisfactory either for cooling into finished form or for the application of a second web to its exterior surface. It will be noted from Fig 42 of the drawings that when a second web either A' or A'' is applied to the applied material it will be bound by a layer of material which is substantially unweakened by air bubbles and will have a uniform texture and appearance throughout its entire area. Furthermore, due to the fact that the edges of the applied material are not thicker than the body of such material, there will be no air trapped between such material and the second web and the edges of such compound product will not be smeared on its edges, as is the case with laminated products produced according to present known methods. These results have been found to have special advantage in the production of laminated products of the type illustrated in Fig. 41 of the drawings for in such a product the two outer sheets A' and A'' may be made of paper while the intermediate sheet may be a cellulose acetate sheet, such as "Cellophane," the product due to the substantial absence of air bubbles in the layers of applied material a and a' and the uniform distribution of such coating material having the appearance of a single sheet of paper.

It will be seen also from the foregoing that the operation of the means by which a layer of material is applied to a foundation sheet includes three essential steps, all of which are carried out while the foundation sheet is moving continuously past the stations at which the several steps are performed under uniform, relatively high tension and at a substantially uniform rate of feed. It has been seen that the first of these steps comprises the application of the material in a hot condition by a roller whose entire surface is pitted with cavities of substantially conical or pyramidal configuration. The material is pressed into such cavities by the pick-up roller and all excess is removed by the reciprocating doctor blade. Thus there is provided an exact, predetermined, equally distributed amount of material to be applied to the portion of under surface of the foundation sheet which bears on the top of the pitted or knurled roller. The applied material in the cavities, due to the heating of the roller, remains in a fluid state and in a condition to be readily discharged to the foundation sheet. As the cavities come successively into engagement with the sheet which, though heated, is at a lower temperature than the applied material, the exposed surfaces of the portions of such material are chilled and become more tacky. This combination of conditions enables the foundation sheet to lift the portions of such material up out of the cavities, against gravity, with such efficiency as to leave the cavities substantially clean of the material. Due to the differences in the speeds at which the surfaces of the roller and the foundation sheet are moving, the portions of material are spread upon the surface of the sheet with a wiping action to form an applied layer having the cross-sectional form illustrated in Fig. 39 of the drawings. This applied layer is not substantially uniform but on the contrary is irregular in thickness and in some places the sheet will be quite bare of the material. The important factor, however, is that equal, exact, quantities of the material have been applied to substantially all portions of the surface of the sheet in positions to be worked into a uniform layer. The applied material which is substantially in the form of "hills" and "dales," so that it has the appearance of fine ribs running generally lengthwise of the sheet and being broken or interrupted at intervals by the said bare spots, is then worked and kneaded by the reciprocating disturbing roll to flatten out the "hills," fill in the "dales" and the bare spots, break up the larger bubbles of air and gather the minute bubbles of air into larger bubbles, some of which are also broken by this operation. Due to the fact that the distributing roller rotates in a direction opposite to the direction of feed of the sheet and is reciprocated transversely to such sheet with one complete stroke for every revolution of the roller, the applied material will be thoroughly worked and kneaded below the surface of such material in two directions to accomplish the results desired. In the last step, all traces of the "hills" and "dales" and substantially all of the bubbles are eliminated by the line contact of the uniformly supported heated small rollers and the surface of the applied material is smoothed and polished. The thus finished layer of material is then either chilled or passed through a similar series of operations for a second superimposed layer of applied material.

It is to be observed from the foregoing, that the outstanding critical features of this invention involve the application of a predetermined high uniform tension to the paper while the layer of material is being applied, distributed and polished; the maintaining of a constant continuous feed of the paper during the successive steps or operations; the exact and equal distribution of the applied material on the paper web, the spreading and kneading of the applied material so as to work it into a relatively uniform thickness throughout the entire area of the web and to collect and break air bubbles and to remove irregularities in its surface; and the substantial elimination of air bubbles and the final smoothing and polishing of the surface of the applied material, thereby producing a layer which is substantially unstreaked, is uniform in thickness and is substantially free of air bubbles. The accuracy with which the machine of this invention applies the material will be appreciated when it is said that the applied material will vary less than one-half a pound in a ream of the previously stated size.

Having thus illustrated and described an embodiment of the invention which will satisfactorily carry out the improved and novel method of manufacturing composite products of the types indicated, it will be obvious to those skilled in the art that changes and modifications may be made without departing from the spirit of the invention. For example, instead of utilizing the doctor blade previously described, mechanisms such as are shown in Figs. 34 and 38 of the drawings, may be used. In the modified form of the machine illustrated in Figs. 34 to 38 of the drawings, the paper feed control unit C, the variable speed change mechanism 18, the unit D, the cooling unit G, and the cooling unit H are similar in construction to the similar units hereinabove described. The modified arrangement differs principally in the respect that the doctor blade 182 associated with roller 173 of unit D has been pivoted so that it no longer functions to control the amount of material applied to the under surface of the strip of paper A. Instead, the amount of material applied to the strip of paper is controlled by a supplementary unit designated generally by the reference character 300 in Fig. 34 of the drawings and including a pair of doctor rollers 301 and 309, which are shown more clearly in Figs. 36 and 38 of the drawings. The roller 301 is rotatably supported by a pair of end brackets 302 secured to a bearing bar 303 which is provided with a longitudinally extending arcuately-shaped recess adapted to receive a portion of the longitudinal exterior surface of the roller 301, as is illustrated more clearly in Fig. 38 of the drawings. The bearing bar 303 is supported by a pair of vertically disposed screw-threaded adjusting rods 304, 304 which extend upwardly from the bar 303 through the heads 305, of a pair of bearing brackets 306, 306 suitably mounted on a section L of the machine.

The bore through each of the heads 305 threadedly receives its associated rod 304 and on the upper ends of such rods there are provided hand wheels 308 whereby the rods 304 may be rotated with respect to the threaded bores of heads 305. It will be seen, therefore, that by moving the hand wheels 308 the rods 304 may be moved upwardly or downwardly relative to the heads 305 to consequently move the roller 301 a similar distance towards or away from the roller 309. This adjustment is in the nature of a micrometer adjustment and is exceedingly accurate. The vertical movement of bar 303 is controlled by a pair of guide blocks 316 which are mounted on brackets 306 and which are slidably engaged with a pair of guide blocks 317 provided on the ends of the bar 303. When the bar 303 is correctly positioned to bring roller 301 into proper relation with roller 309 for the applying operation, it can be locked in position by the lock nuts 307 (see Figs. 35 and 36).

The roller 309 is rotatably mounted in an arcuately-shaped recess extending longitudinally in the upper end of an inverted V-shaped block 312, as is shown more clearly in Fig. 38 of the drawings. The block 312, which is made of metal, preferably aluminum, is secured to the bracket 306 by means of a pair of integral side brackets 311. The block 312 is provided with an internal longitudinally extending slot or recess 313 of such depth as to enable a heating unit 314 to be inserted into the block 312 to a point adjacent to and closely beneath the apex thereof. The heating unit 314 is supported in position in the recess 313 by a pair of crosss bars 314' which are secured to the ends of the V-shaped block 312.

It will be evident from the above description of the mechanism illustrated in Figs. 35 to 38 of the drawings, that as the paper strip A with the applied material, which has been applied thereto by the knurled roller of unit D, passes between the two rollers 301 and 309 any excess of such material above a predetermined amount, as determined by the distance between the rollers, will be taken off and such excess will flow downwardly from the heated roller 309 over the heated V-shaped block 312 and then return back to the supply pan 179 which extends beneath such block, as can be clearly seen in Figs. 35 and 38 of the drawings. It will also be apparent that while this mechanism may be used in conjunction with the various mechanisms described in preferred form of the invention, it may also be used in the form illustrated in Figs. 35 to 38 of the drawings as a separate machine, as is illustrated in such figures.

I claim:

1. A machine for applying a layer of coating material to a web of paper or the like, comprising a reservoir for the coating material, a pickup roller for carrying the coating material from the reservoir to a coating roller, a coating roller for transferring the coating material from the pick-up roller to the web, said coating roller having its entire coating surface pitted with cavities, means for driving said coating roller at a surface speed less than the speed of feed of the web so that the web slides over the engaged surface portion of said coating roller and the coating material is applied from such roller to the web with a wiping action, a rotating roller engaging the applied coating material, said rotating roller being supported throughout its entire length and having a relatively small radius so as to engage the coating material in a substantially line contact, means in rear of said rollers for feeding the web and means in advance of said rollers for causing the web to be fed at a continuous, uniform rate and under a predetermined, relatively high tension.

2. A machine for applying a layer of coating material to a web of paper or the like, comprising a reservoir for the coating material, a pick-up roller for carrying the coating material from the reservoir to a coating roller, a coating roller for transferring the coating material from the pick-up roller to the web, said coating roller having its entire coating surface pitted with cavities and having a surface speed less than the speed of feed of the web so that the coating material is applied to the latter with a wiping action, a reversely rotating distributing roller engaging the applied coating material, means to reciprocate said distributing roller along its longitudinal axis, a smoothing roller engaging the applied coating material, said smoothing roller having a relatively small diameter so as to engage the coating material in a substantially line contact and having a surface speed less than the speed of feed of the web, means in rear of said rollers for feeding the web and means in advance of said rollers for causing the web to be fed at a continuous, uniform rate and under a predetermined, constant tension.

3. A machine for applying a layer of coating material to a web of paper or the like comprising a reservoir for the coating material, a pick-up roller for carrying the coating material from the reservoir to a coating roller, a coating roller for transferring the coating material from the pick-up roller to the web, said coating roller having its entire coating surface pitted with cavities and having a surface speed less than the speed of feed of the web so that the coating material is applied to the latter with a wiping action, a reversely rotating distributing roller engaging the applied coating material, means to reciprocate said distributing roller along its longitudinal axis, a plurality of smoothing rollers engaging the applied coating material, said smoothing rollers being positioned adjacent to one another in parallel relation and being each supported throughout its entire length and said smoothing rollers having a relatively small diameter so as to engage the coating material with a substantially line contact, means in rear of said rollers for feeding the web and means in advance of said rollers for causing the web to be fed at a continuous, uniform rate and under a predetermined, constant tension.

4. A machine such as claimed in claim 1, in which said last-mentioned means comprises a metal roller and a rubber-coated roller adapted to be rotated by said web, a breaking member fixedly connected to said rubber coated roller, a revolvably mounted braking member engageable with said first-mentioned braking member, means for positively driving said revolvably mounted braking member and adjustable means for varying the engagement of said braking members.

5. A machine such as claimed in claim 1, including means for heating said coating roller and said last-mentioned roller to a temperature above the melting-point temperature of the coating material.

6. A machine such as claimed in claim 1, including a doctor blade for removing surplus material from the coating roller, said doctor blade including a relatively thin strip of metallic material, a plurality of means separately adjustable to cause said strip to bear with uniform pressure throughout all portions of its longitudinal length against the face of the coating roller and means for reciprocating said doctor blade.

7. A machine for applying a layer of coating material to a web of paper or the like comprising means for feeding the web at a continuous, uniform rate and under a predetermined, constant, relatively high tension, means for applying the coating material to the surface of the web with a wiping action so as to form a series of longitudinally extending ridges of coating material on the web, reciprocating means for working the applied coating material to distribute it over the surface of the web and means for smoothing the surface of the coating material until it is evenly distributed.

8. A machine for applying a layer of coating material to a web of paper or the like comprising means for feeding the web at a continuous, uniform rate and under a predetermined constant tension, means for applying the coating material to a surface of the web and means for smoothing the applied coating material including a plurality of parallelly arranged smoothing rollers of relatively small diameter so as to engage the coating material along a substantially line contact, and means for driving said rollers so that their surface speed is less than the speed of feed of the web.

9. A machine such as defined in claim 8, in which said smoothing means includes a plurality of radially extending heating fins having guideways at their outer ends for the reception of said smoothing rollers and means for supplying heat through said fins to said rollers.

10. A machine such as defined in claim 8, in which said smoothing means includes a pivoted base, means for heating said base, a plurality of radially extending heating fins projecting outwardly from said base and provide on their outer ends with guideways adapted to receive said smoothing rollers, said fins being of equal width so that said rollers are arcuately arranged and means for adjusting said base about its pivot.

11. A machine for applying a layer of coating material to a web of paper or the like comprising a plurality of base sections of similar construction, means for connecting said sections together, each of said sections having a pair of spaced longitudinally extending guideways aligned with the guideways of the other sections, a plurality of units supported on said sections, each of said units having bases provided with guides adapted to fit in the guideways of said sections, means adjustably connecting the bases of said units to said sections, said units being individual and independent mechanisms and including a unit for feeding the web at a continuous uniform rate and under a predetermined constant tension, a unit adapted to apply the coating material to the surface of the web so as to form a series of longitudinally extending ridges of coating material on the web, a unit adapted to work the applied coating material to distribute over the surface of the web and a unit adapted to smooth and to polish the surface of the coating material.

12. A machine for applying a layer of coating material to a web of paper or the like, comprising a reservoir for the coating material, a pick-up roller for carrying the coating material from the reservoir to a coating roller, a coating roller for transferring the coating material from the pick-up roller to the web, said coating roller having its entire coating surface pitted with cavities and having a surface speed less than the speed of feed of the web so that the coating material is applied to the latter with a wiping action, a rotating roller engaging the applied coating material, said rotating roller being supported throughout its entire length and having a relatively small radius so as to engage the coating material in a substantially line contact, means in rear of said rollers for feeding the web and means in advance of said rollers for causing the web to be fed at a continuous, uniform rate and under a predetermined, relatively high tension, said last-mentioned means comprising a metal roller and a rubber-coated roller, braking means connected to said rubber-coated roller for controlling the rotational speed of said roller, and means for adjusting said metal roller and said rubber-coated roller relative to each other.

13. A machine for applying a layer of coating material to a web of paper or the like, comprising a reservoir for the coating material, a pick-up roller for carrying the coating material from the reservoir to a coating roller, a coating roller for transferring the coating material from the pick-up roller to the web, said coating roller having its entire coating surface pitted with cavities and having a surface speed less than the speed of feed of the web so that the coating material is applied to the latter with a wiping action, a rotating roller engaging the applied coating material, said rotating roller being supported throughout its entire length and having a relatively small radius so as to engage the coating material in a substantially line contact, means in rear of said rollers for feeding the web and means in advance of said rollers for causing the web to be fed at a continuous, uniform rate and under a predetermined, relatively high tension, said last-mentioned means comprising a metal roller and a rubber-coated roller, means for adjusting said rollers relative to one another, a clutch member connected to said rubber-coated roller, a revolvably supported clutch member engageable with said first-mentioned clutch member, and means for varying the degree of engagement of said clutch members.

14. A machine for applying a layer of coating material to a web of paper or the like, comprising a reservoir for the coating material, a pick-up roller for carrying the coating material from the reservoir to a coating roller, a coating roller for transferring the coating material from the pick-up roller to the web, said coating roller having its entire coating surface pitted with cavities and having a surface speed less than the speed of feed of the web so that the coating material is applied to the latter with a wiping action, a rotating roller engaging the applied coating material, said rotating roller being supported throughout its entire length and having a relatively small radius so as to engage the coating material in a substantially line contact, means in rear of said rollers for feeding the web, means in advance of said rollers for causing the web to be fed at a continuous, uniform rate and under a predetermined, relatively high tension, guide rollers associated with said coating and said last-mentioned roller, means for heating said guide rollers to a temperature above the melting point temperature of the coating material and adjustable means for varying the positions of said guide rollers, the adjustable means for each guide roller including a pair of threaded rods and a transverse control rod, gear means connecting said transverse rod with said threaded rods, a hand wheel connected to said transverse rod and coupling means intermediate the ends of said transverse rod, whereby both of said threaded rods may be rotated simultaneously or only one of them, as said hand wheel is adjusted.

15. A machine for applying a layer of coating material to a web of paper or the like, comprising a reservoir for the coating material, a pick-up roller for carrying the coating material from the reservoir to a coating roller, a coating roller for transferring the coating material from the pick-up roller to the web, said coating roller having its entire coating surface pitted with cavities and having a surface speed less than the speed of feed of the web so that the coating material is applied to the latter with a wiping action, a doctor blade for removing surplus material from the coating roller, said doctor blade including a relatively thin strip of metallic material, a plurality of spring fingers supporting said strip, means for adjusting each of said spring fingers to cause said strip to bear with uniform pressure throughout its entire length against the face of the coating roller, a rotating roller engaging the applied coating material, said rotating roller being supported throughout its entire length and having a relatively small radius so as to engage the coating material in a substantially line contact, means in rear of said rollers for feeding the web and means in advance of said rollers for causing the web to be fed at a continuous, uniform rate and under a predetermined, relatively high tension.

16. A machine for applying a layer of coating material to a web of paper or the like, comprising a reservoir for the coating material, a pick-up roller for carrying the coating material from the reservoir to a coating roller, said reservoir being provided with an inclined bottom surface portion sloping towards the end of the reservoir into which said pick-up roller is dipped and including a plurality of heating fins extending upwardly from said inclined bottom portion and arranged in staggered relation, means for applying heat to said fins, a coating roller for transferring the coating material from the pick-up roller to the web, said coating roller having its entire coating surface pitted with cavities and having a surface speed less than the speed of feed of the web so that the coating material is applied to the latter with a wiping action, a rotating roller engaging the applied coating material, said rotating roller being supported throughout its entire length and having a relatively small radius so as to engage the coating material in a substantially line contact, means in rear of said rollers for feeding the web and means in advance of said rollers for causing the web to be fed at a continuous, uniform rate and under a predetermined, relatively high tension.

17. A machine for applying a layer of coating material to a web of paper or the like, comprising a reservoir for the coating material, a pick-up roller for carrying the coating material from the reservoir to a coating roller, a coating roller for transferring the coating material from the pick-up roller to the web, said coating roller having its entire coating surface pitted with cavities and having a surface speed less than the speed of feed of the web so that the coating material is applied to the latter with a wiping action, a rotating roller engaging the applied coating material, said rototing roller having a relatively small radius so as to engage the coating material in a substantially line contact and being rotatably supported throughout its entire length in a longitudinally extending recess provided in the upper narrow end of an inverted, substantially V-shaped support, a heating unit extending through said support, a guide roller of small diameter arranged in parallel relation adjacent to said uniformly supported roller, means for maintaining the web against said guide roller and spaced from said uniformly supported roller, means for adjusting the distance between said uniformly supported roller and said guide roller, means in rear of said rollers for feeding the web and means in advance of said rollers for causing the web to be fed at a continuous, uniform rate and under a predetermined, relatively high tension.

18. In a machine for applying a layer of coating material to a web or the like, means for feeding the web under an even, longitudinal, relatively high tension, a coating roller adapted to deposit accurate, predetermined amounts of coating material on the web, a flexible doctor blade, a plurality of means associated with said blade and adapted to cause said blade to bear with uniform pressure throughout all portions of its longitudinal length against the face of the coating roller, means for reciprocating said doctor blade and means for driving said coating roller in the direction of feed of said web and at a surface speed less than the speed of feed of the web so that the web slides over the engaged surface portion of said coating roller and the material is applied from such roller to the web with a wiping action so as to form a series of longitudinally extending ridges of the coating material.

KARL DAMMANN.